US012615585B2

(12) United States Patent
Dees et al.

(10) Patent No.: US 12,615,585 B2
(45) Date of Patent: Apr. 28, 2026

(54) RELAY SELECTION IN CELLULAR SLICED NETWORKS

(71) Applicant: KONINKLIJKE PHILIPS N.V., Eindhoven (NL)

(72) Inventors: Walter Dees, Eindhoven (NL); Esko Olavi Dijk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 978 days.

(21) Appl. No.: 17/623,908

(22) PCT Filed: May 13, 2020

(86) PCT No.: PCT/EP2020/063382
§ 371 (c)(1),
(2) Date: Dec. 30, 2021

(87) PCT Pub. No.: WO2021/001086
PCT Pub. Date: Jan. 7, 2021

(65) Prior Publication Data
US 2022/0369215 A1       Nov. 17, 2022

(30) Foreign Application Priority Data

Jul. 3, 2019    (EP) ..................................... 19184170
Jan. 10, 2020   (EP) ..................................... 20151306

(51) Int. Cl.
*H04W 48/18*           (2009.01)
*H04B 7/26*            (2006.01)
(Continued)

(52) U.S. Cl.
CPC .......... *H04W 48/18* (2013.01); *H04B 7/2606* (2013.01); *H04W 76/12* (2018.02);
(Continued)

(58) Field of Classification Search
CPC ..... H04W 48/18; H04W 76/12; H04W 76/14; H04W 76/15; H04W 88/04; H04W 92/18; H04W 12/04; H04W 88/18; H04B 7/2606
(Continued)

(56) References Cited

U.S. PATENT DOCUMENTS 9,445,352 B2    9/2016   Wu et al.
9,565,573 B2    2/2017   Mukherjee et al.
(Continued)

FOREIGN PATENT DOCUMENTS

EP        3121974 A1      1/2017
WO    2018031343 A1      2/2018
(Continued)

OTHER PUBLICATIONS

3GPP TS 22.261 v16.7.0, Service requirements for the 5G system; Stage 1, Mar. 2019.
(Continued)

*Primary Examiner* — Michael Y Mapa

(57)           ABSTRACT

A cellular communication system supports network slicing and has a network relay function (140) for managing the indirect connections. A mobile device (110) may send a request message to a relay device (120), the request message including a slice to access. A response message indicates available slice(s) and relay device(s). The device selects a slice and/or relay device in dependence of the response message. The relay device receives the request message and sends a transfer request message to the cellular communication system indicating a request to transfer data via an indirect connection and including the requested slice, and sends the response message. The network relay function receives the transfer request message, obtains relay capability data regarding relay device(s) capable of data transfer for available slice(s) in dependence of the requested slice; and
(Continued)

sends a transfer response message including network relay information indicating the available relay device(s) that can serve as relay device for indirect communication with the requested network slice.

29 Claims, 7 Drawing Sheets

(51) Int. Cl.

| | |
|---|---|
| *H04W 76/12* | (2018.01) |
| *H04W 76/14* | (2018.01) |
| *H04W 76/15* | (2018.01) |
| *H04W 88/04* | (2009.01) |

(52) U.S. Cl.
CPC .......... *H04W 76/14* (2018.02); *H04W 76/15* (2018.02); *H04W 88/04* (2013.01)

(58) Field of Classification Search
USPC .......... 370/315; 455/7, 41.2, 450–452.2, 509
See application file for complete search history.

(56) References Cited

U.S. PATENT DOCUMENTS

| | | | |
|---|---|---|---|
| 9,826,460 | B2 | 11/2017 | Patil et al. |
| 10,177,834 | B2 | 1/2019 | Basu Mallick et al. |
| 10,212,651 | B2 | 2/2019 | Gulati et al. |
| 2014/0370802 | A1 | 12/2014 | Chang |
| 2016/0212721 | A1 | 7/2016 | Sheng et al. |
| 2016/0227518 | A1 | 8/2016 | Li et al. |
| 2016/0295494 | A1* | 10/2016 | Gulati ................. H04W 72/542 |
| 2018/0035448 | A1 | 2/2018 | Gupta et al. |
| 2018/0054237 | A1* | 2/2018 | Tseng ................ H04W 36/0022 |
| 2018/0092017 | A1 | 3/2018 | Freda et al. |
| 2019/0159015 | A1 | 5/2019 | Qiao et al. |
| 2019/0239156 | A1 | 8/2019 | Wang et al. |
| 2019/0349951 | A1 | 11/2019 | Ahmad |
| 2022/0239568 | A1* | 7/2022 | Celozzi ................ H04L 41/342 |
| 2022/0369215 | A1 | 11/2022 | Dees |

FOREIGN PATENT DOCUMENTS

| | | | |
|---|---|---|---|
| WO | 2018180496 | A1 | 4/2018 |
| WO | 2018129543 | A1 | 7/2018 |
| WO | 201808338 | A1 | 11/2018 |

OTHER PUBLICATIONS

3GPP TR 22.866 v0.2.0, enhanced Relays for Energy Efficiency and Extensive Coverage; Stage 1, Feb. 2019.

3GPP TS 23.287 v1.0.0, Architecture enhancements for 5G System (5GS) to support Vehicle-to-Everything (V2X) services (Release 16), May 2019.

3GPP TS 23.303 v15.0.0, Proximity-based services (ProSe); Stage 2 (Release 15), Jun. 2017.

3GPP TS 23.501, System Architecture for the 5G System; Stage 2, v16.0.2, Apr. 2019.

3GPP 23.503, TS Policy and charging control framework for the 5G System (5GS); Stage 2 (Release 15.6.0 Jun. 2019).

3GPP TR 23.733 v15.1.0, Study on Architecture Enhancements to ProSe UE-to-Network Relay (Release 15), Dec. 2017.

3GPP TS 24.334 v15.1.0, Proximity-services (ProSe) User Equipment (UE) to ProSe function protocol aspects; Stage 3, Dec. 2017.

5G StandAlone Access—Registration Procedure—Part2(AMF selection procedures, slices), https://www.linkedin.com/pulse/5g-standalone-access-registration-procedure-part2amf-pavel-shulgin/.

3GPP TS 29.507, 5G System; Access and Mobility Policy Control Service; Stage 3, (Release 15.4.0 Jun. 2019).

3GPP TR 33.813 v0.5.0, Study on Security Aspects of Enhanced Network Slicing, Nov. 2018.

3GPP TS 36.300 v15.2.0, Evolved Universal Terrestrial Radio Access (E-UTRA) and Evolved Universal Terrestrial Radio Access Network (E-UTRAN); Overall description; Stage 2.

3GPP TR 36.746 v15.1.0, Study on further enhancements to LTE Device to Device (D2D), User Equipment (UE) to network relays for Internet of Things (IoT) and wearables; (Release 15), Apr. 2018.

3GPP TS 38.300 v15.5.0, NR; NR and NG-RAN Overall Description; Stage 2, Mar. 2019.

3GPP TS 38.331 v15.5.1, NR; Radio Resource Control (RRC) protocol specification, Apr. 2019.

3GPP TS 38.473, v15.4.1, NG-RAN; F1 application protocol (F1AP), Jan. 2019.

3GPP TR 38.874 v16.0.0, NR; Study on Integrated Access and Backhaul, Dec. 2018.

3GPP TS 23.501 CR1522 Introduction of the IAB support in 5GS, Jun. 2019.

Elayoubi et al., 5G RAN Slicing for Verticals: Enablers and Challenges, IEEE Communications Magazine vol. 57 Iss. 1, 2019.

EventHelix website, https://www.eventhelix.com/5G/standalone-access-registration/ with links to pdf file overview and detailed messages.

International Search Report and Written Opinion from WO2021/0001086 mailed Jan. 7, 2021.

* cited by examiner

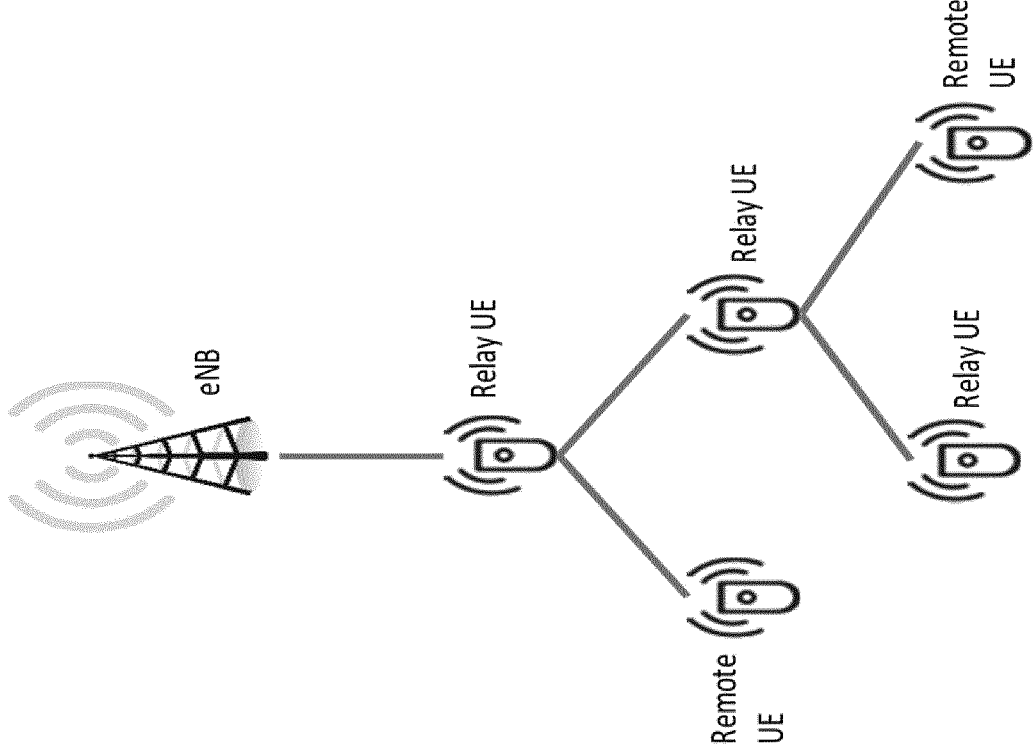
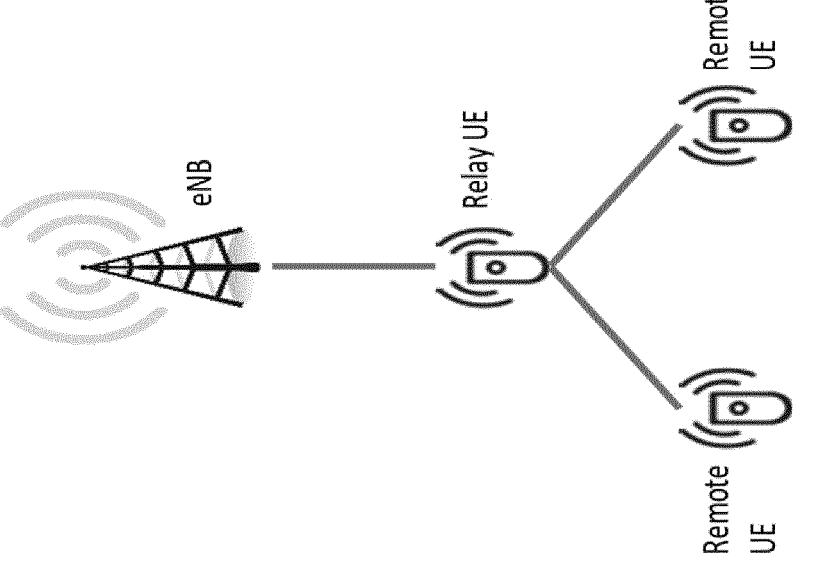
Fig. 2   (prior art)

Fig. 6a             Fig. 6b

RELAY SELECTION IN CELLULAR SLICED NETWORKS

CROSS REFERENCE TO RELATED APPLICATIONS

This application is a U.S. national phase application of International Application No. PCT/EP2020/063382 filed on May 13, 2020, which claims the benefit of EP application Ser. No. 19184170.9 filed on Jul. 3, 2019 and EP application Ser. No. 20151306.6 filed on Jan. 10, 2020 and are incorporated herein by reference.

FIELD OF THE INVENTION

The present invention relates to the field of well-known cellular wireless communication systems (CCS), e.g. LTE, 4G or 5G networks. The cellular wireless communication system comprises a core network (CN) and a Radio Access Network (RAN) comprising multiple cellular base stations (BS). The cellular communication system may provide a cellular network that supports network slicing and indirect connections, while mobile devices may connect to the core network via the base stations. Access to the network is managed by so-called providers or mobile network operators (MNO). A network slice provides a logical network using a shared physical infrastructure of the cellular communication system. An indirect connection provides data transfer between a mobile device and the cellular communication system via at least one relay device.

BACKGROUND OF THE INVENTION

Mobile devices communicating using cellular wireless communication standards are being further developed continuously, for example according to 3GPP 5G specifications. The wireless devices can be of different types, e.g. mobile phones, vehicles for vehicle-to-vehicle (V2V), or more general vehicle-to-everything communication (V2X), internet of things (IoT) devices, medical (emergency) diagnosis and treatment devices, virtual reality (VR) headsets, etc. Because the characteristics of mobile devices like the above differ vastly, e.g. in terms of low-power operation, tolerated maximum latency, required bandwidth and mobility, the 5G system and radio access network specifications define the concept of network slicing (see [23.501], [38.300], [Elayoubi]).

A network slice can be viewed as an isolated 'virtual 5G network' that operates on a common shared hardware/software platform, where platform components may be shared among multiple slices, but each slice still operates independently. Each slice can offer a performance, service level, policies and features that is optimally tailored to the specific use case or application domain. A slice can also be operated as a service by a different network operator than the one owning the hardware/software platform. Slicing can be done in a Core Network (CN), or in a Radio Access Network (RAN), or both.

A mobile device, commonly name user equipment (UE) may be part of multiple slices at the same time. The UE may establish multiple Protocol Data Unit (PDU) sessions to the CN, each session operating in a specific slice. Further explanation about network slicing can be found in [PavelShulgin]. The UE also covers the case the UE is a stationary device. The user equipment may be any device used directly the end user. This includes non-stationary and stationary devices. Another characteristic of a UE is that it typically uses the 3GPP Uu interface to communicate with the base station, and that it typically has its own mobile subscription, its own SIM card and is identifiable through IMSI.

An example of requesting a session operating in a slice is discussed in [EventHelix]. FIG. 1 shows an excerpt from a diagram showing User Equipment (UE) requesting a slice. The UE sends a Requested Network Slice Selection Assistance Information (NSSAI) in the 21:RRCSetupComplete message and the Base Station (gNB) forwards this information in the 24:NGAP Initial UE Message that it sends. The term 5GC is used to denote the 5G Core Network.

In the 3GPP specifications for 4G the Proximity Services (ProSe) functions (see [23.303] and [24.334]) are defined to enable connectivity for cellular User Equipment (UE) that is temporarily not in coverage of a cellular network base station (eNB). This particular function is called ProSe UE-to-network relay, or relay UE for short. The relay UE is a UE that helps another out-of-coverage (OoC) UE to communicate to the eNB by relaying application and network traffic in two directions between the OoC UE and the eNB. The local communication between the relay UE and the OoC UE is called device-to-device (D2D) communication or Sidelink (also known as PC5) communication (see [23.303] and [24.334]). Once the relaying relation is established, the OoC-UE is back in coverage via the relay UE and acts in the role of 'remote UE'. This situation means the remote UE has an indirect connection to the 4G Core Network as opposed to a direct network connection which is the normal case.

Ongoing work in 3GPP (see [22.866]) extends the concept of the single-hop relay to support communication over multiple wireless hops and the use of relays for commercial/IoT application areas. FIG. 2 shows an illustration of communication via Single hop (left) and Multi-hop (right) using UE-based relay devices. Currently, ProSe (as shown left) only allows Relays that provide a single hop towards the network/gNB, to enable a remote UE to have an indirect connection to eNB and 4G Core Network. The aim is to enable multi-hop relaying (as shown right), where Relay capable UEs can be connected to other Relay capable UEs.

Other work in 3GPP (see [23.733] and [36.746]) involves studies on architecture enhancements e.g. to enable an IoT device (in a role of remote UE) to operate on very low power by using a relay UE to connect to the wider network. Because the relay UE is physically very close, it can be reached using very low power transmissions. This work also includes security, speed and stability improvements to ProSe. These are not yet implemented in ProSe based on 4G, but may be adopted in ProSe based on 5G.

In this document the terms 'eNB' (4G term) and 'gNB' (5G term) mean cellular base station. The eNB/gNB is part of the Radio Access Network RAN, which interfaces to functions in the Core Network CN. 'OoC' is Out-of-Coverage. 'indirect connection' is the same as 'indirect network connection' as defined in [22.261]. Slice-specific 5G terminology NSSAI, S-NSSAI, NSSF, etc. is defined in [23.501]. 'D2D' is Device-to-Device communication, and 'PC5' is the interface for sidelink communication as defined by ProSe [23.303], eProSe [36.746] or V2X [23.287].

Various legacy solutions involving relaying are known in the art, related to 3GPP work (each number below is a separate topic):

US20180092017A1, U.S. Pat. No. 9,826,460, U.S. Ser. No. 10/212,651B2, US20160212721A1 describe selecting one relay out of multiple candidate relays based on signal strength, or advertised group ID;

U.S. Ser. No. 10/177,834B2 describes eNB broadcasts bandwidth requirements for a relay into its cell and relay-capable devices automatically use this to determine to become a relay if they meet the requirement;

US20160227518A1 describes eNB determines that a UE is OoC and that it needs to send to that UE some information (via a Relay) to help it to get connected again US20160227518A1 describes a relay-capable UE deciding to become relay only if it has sufficient connectivity capacity, or battery power, or a proper service type/context;

U.S. Pat. No. 9,445,352B2 describes an OoC UE needing a relay so it sends a D2D message to its neighbors to request someone to become a Relay, upon which one or more UEs become a relay;

WO2018083381A1 describes an OoC UE asking a peer UE over Sidelink/D2D some configuration information that it needs to get back connected to the network, via a relay;

US20180035448A1 describes an eNB sending Sidelink scheduling grant information with specific scheduling for OoC UEs; this information is received by in-coverage UEs and by these UEs retransmitted to the OoC UEs;

U.S. Pat. No. 9,565,573B2 describes that in-coverage UE sends a D2D signal, to which an OoC UE can respond with an indication that it needs coverage. The in-coverage UE then sends this received indication to the network. Optionally the network can then use this indication to instruct the in-coverage UE to become a relay.

SUMMARY OF THE INVENTION

There is a need to include ProSe relaying or a similar technology for UE-based relaying into next generation cellular communication networks such as 5G. However, the use of network slices as introduced by 5G introduces new requirements and new challenges if UE based relaying needs to be considered, such as the following.

The UE needs to be able to connect to one or more of its required and/or preferred 5G network slice instances via a relay UE, and hence it needs to know which relay UEs in vicinity would be capable or would not be capable to do so;

There may be multiple candidate relay UEs in the radio range of the UE, whereby relay UEs may move around and go out of range, and new relay UEs may appear in range;

The network slice instances required and/or preferred by UE may be different from the slice(s) which the best relay UE candidate is connected to at that moment;

The UE may be OoC at the moment the selection needs to be made;

The relay UE may be a resource constrained device, and hence may not be able to provide the QoS as expected/required for a certain network slice;

The relay UE may have one or more PDU connections of its own (i.e. since it is typically a UE owned by someone else wishing to access e.g. the internet) and may have very limited resources left for supporting indirect network communication for another UE;

A network slice required or preferred by UE may use a different frequency band than currently used by the relay UE candidates;

The UE may participate in two or more network slices which each have their unique requirements in terms of what constitutes the optimal Relay and corresponding network path for the indirect connection, and hence there may be need to select two (or even more) relay UEs as an optimal solution to perform the relaying;

The candidate relay UEs are typically a-priori unknown and untrusted to the UE—posing a mutual security risk since there is no initial trust between parties and using unsecure procedure to connect to the relay UE also imposes security risks. For example, the UEs that are to start a Relay/Remote relation may have never encountered before. This case may commonly occur if e.g. 1) mobile cellular IoT devices move around, or 2) mobile or stationary cellular IoT devices are deployed and activated for the first time in a new environment.

A candidate relay UE may not be authorized and may not have the necessary credentials to connect to the network slice and/or to send/receive data to/from the network slice and/or to participate in a relay connection towards the network slice, in particular for private network slices that are only allowed to be used by UEs belonging to a pre-defined group.

Some of these considerations also apply for accessing Non-Public Networks (NPNs), see [23.501]. This concept has some similarities with network slices that has been introduced in 5G. NPNs are dedicated networks for a limited set of users and can operate either as a separate mobile core network, or on top of a Public Land Mobile Network (PLMN) of a mobile network operator whereby the NPN typically is deployed as a slice and/or Closed Access Group within the PLMN. Besides the fact an NPN could be implemented on top of an existing hardware/software infrastructure using a network slice, an NPN could also have one or more slices of its own, in particular if the NPN is operated as a separate standalone network. In a manner similar to that of slices, also relaying of traffic targeted to certain NPNs may be restricted to only remote UEs and relay UEs that are authorized to have access to the NPN. Also NPNs may have some requirements for minimum QoS and service area restrictions and other aspects that are similar to network slices, and also other dynamic aspects need to be taken into account to assess whether the relay UE is suitable to act as a relay for a data connection between the remote UE and the NPN. In the remainder of the document, the term network slice is also used to denote a Non-Public Network.

It is an object of the invention to provide, in a cellular communication system that uses network slices, a proper selection of a relay device that can provide to a mobile device an indirect connection to the cellular communication system.

For this purpose, devices and methods are provided as defined in the appended claims. According to an aspect of the invention a cellular communication system is provided as defined in claim 1. A mobile device is provided as defined in claim 12. According to a further aspect of the invention there is provided a relay device as defined in claim 13 and a network relay entity as defined in claim 14. According to a further aspect of the invention there are provided methods as defined in claims 15, 16 and 17. According to a further aspect of the invention there is provided a computer program product downloadable from a network and/or stored on a computer-readable medium and/or microprocessor-executable medium, the product comprising program code instructions for implementing the above method when executed on a computer.

The cellular communication system (CCS) comprises a radio access network (RAN) comprising multiple cellular base stations (BS) and a core network (CN). The cellular communication system provides a cellular network that supports network slicing and indirect connections, each network slice providing a logical network using a shared physical infrastructure of the cellular communication system, each indirect connection providing data transfer between a mobile device and the cellular communication system via at least one relay device being a mobile device arranged for communication with the radio access network and capable of supporting the indirect connection. The cellular communication system comprising at least one network relay entity arranged to provide a network relay function (NRF) for managing the indirect connections.

The mobile device comprises a transceiver arranged for wireless communication in the cellular network, and a connection processor arranged for managing connections to the cellular network, the connection processor providing a relay function (116) for managing at least one indirect connection. The relay function may be arranged—to send a request message (M) to at least one relay device (UEx), the request message including a requested identifier (ID1) indicating a network slice which the mobile device is requesting access to;

to receive at least one response message (N) from at least one relay device, the response message optionally including an indication (such as slice relay information) indicating at least one available slice for relaying via at least one relay device for providing an indirect connection, the indication being either explicit (e.g. as part of an additional 'slice relay information' field in response message N), or implicit (e.g. message N being an acknowledgement confirming the requested slice can be relayed via the respective relay device);

to select, in dependence of the response message, a relay device (UEy) from the at least one relay device; and to engage the indirect connection to the requested slice via the selected relay device.

The relay device comprises a communication unit arranged for communication in the cellular network, and a relay processor arranged for managing the communication in the cellular network and for managing an indirect connection between the mobile device and the cellular network. The relay processor may be arranged to receive the request message (M) from the mobile device;

to send a transfer request message (M') to the cellular communication system in dependence of the request message, the transfer request message indicating a request from the mobile device to communicate with a requested slice via an indirect connection and including the requested identifier (ID1);

to receive a transfer response message (N') from the cellular communication system;

to send the response message (N) to the mobile device in dependence of the transfer response message.

The network relay function may be arranged to receive at least one transfer request message (M') via at least one cellular base station;

to obtain relay capability data regarding relay devices capable of data transfer for at least one available slice to, and from, the mobile device, the available slice being determined in dependence of the requested identifier (ID1); and to send at least one transfer response message (N') via at least one cellular base station, the transfer response message including network relay information indicating at least one relay device capable of transferring data of the network slice that the mobile device is requesting access to.

Receiving the transfer request message via the base station may mean that the base station may be the originator of a new message to the network relay function that encapsulates the information contained in the message M' send by the relay device. Similarly, sending the transfer response message (N') via at least one cellular base station may mean that the base station may terminate the message from the network relay function and encapsulate the information in a new message (N) that is then sent to relay device.

Advantageously, the cellular network is able to assist mobile devices (e.g. 5G UEs) that are in need of a relay—in order to send and receive messages to/from the network (e.g. out of coverage devices, devices with a bad signal to the nearby base stations or devices that have very low battery)—by allowing these devices to initiate communication via a chosen relay device that optimally supports the network slice, or set of network slices, that the UE needs to use.

The enhanced selection of a relay device is also faster and more efficient than a trial-and-error approach in which the UE would simply attempt to set up a connection to the requested slice through each of the candidate relay UEs, perform the RAN attachment, then perform the CN attachment/authentication, and only then learn whether the selected Relay was in fact good enough or not allowed to connect to its desired slice(s). If not good enough, it can try with a second Relay candidate, however in this way the optimal Relay to select is still unknown until all candidates have been tried. This process would take long and waste of RF/energy resources.

In addition, the enhanced relay device selection done with NRF assistance will be better than a UE locally selected relay device, because the NRF is able to use more information for the selection. This information may for example be knowledge of connection quality of potential relay devices—towards gNB or towards other relay devices, historical QoS performance of potential relay devices, and knowledge about characteristics of each slice that is being requested, etc. It may also have information in relation to roaming, e.g. the mobile device may be an inbound roaming device, and the relay device may not have knowledge about such roaming devices. So overall, the new cellular communication network is able to apply complex and/or dynamic and/or slice-dependent and/or non-public network dependent policies to the process of relay device selection.

In addition, the enhanced relay device selection performed with NRF assistance also allows to make use of the most up to date information required to make a good assessment on whether the relay device can meet the requirements of the slice, including using dynamic aspects, such as how much resources are left on the relay device and the network to handle the additional traffic from the mobile device, the signal strength between the mobile device and relay device, and between the relay device and the network, the current location and/or tracking/service area of the relay device and the mobile device, number of hops between the mobile device and the network in a multi-hop situation. Since it can use the most up to date information, the enhanced relay device selection done with NRF also benefits mobile devices (and also relay devices) that may have been out of coverage (OoC) or asleep for a while, and in particular if the mobile device is out of direct coverage of a base station at the time it wishes to discover and connect to a relay device. Whereas some solutions based on ProSe discovery first require the mobile device and relay device to request permission from the network and fetch the required information before they can start discovery or connect to the relay device, and the mobile device and relay device may hence use outdated information if the mobile device has been out of coverage for a while, by using the enhanced relay device selection done with NRF assistance the mobile device can always initiate a request for a particular network slice (e.g.

using a generic discovery and connection request mechanism as described in further detail later in the document), upon which the relay device even if it has no information about the requested network slice can ask the NRF to assess whether or not the relay device is authorized (or can be authorized) and is capable (or can be made capable, e.g. by reconfiguring PDU sessions or start an additional PDU session) to perform relaying of data to/from the requested network slice or non-public network.

In addition, information about slices and non-public networks may be considered privacy sensitive. It could lead to undesired tracking of mobile devices and expose deployment information of the operator (e.g. which slices and NPNs are supported by the core network). Hence, by using the NRF, no unnecessary information needs to be stored in the Relay UE, which is typically an untrusted end-user device.

The present state of art, including 3GPP specifications, does not solve these problems, inter alia because network slice information is not communicated in system information blocks (e.g. MIB and SIBs in [38.331]) that a base station is broadcasting to in-coverage UEs, and through ProSe based relay UEs to OoC UEs. Furthermore, in 5G, in order to prevent privacy leakage of slice information, the slice information may only be sent to the UE later in the process during CN attachment/authentication after some initial security context is in place, hence no slice information (or only encrypted or temporary slice information) is sent early in the process. Moreover, a relay UE may not be able to access, not be authorized to access, or not be able to support the characteristics (e.g. a required QoS or frequency band) of the slice that the remote UE wants to use.

Also, simply selecting a relay device based on whether they are part of the same slice does not work, for example because, if a certain slice is supported by the 5G network for a given relay device R, it does not imply that the remote UEs or other relay devices connected to relay device R can also make use of this slice. This may not be the case, for example, because the specific slice is dedicated to Ultra-Reliable Low-Latency Communication (URLLC) and the additional 'hop' via a relay device conflicts with the low-latency property of the URLLC slice. Hence it may be the case that the relay device should not offer such slice at all. Furthermore, the decision of whether a certain relay device can relay data traffic for a particular slice has to be based on the most up to date information, and should also work if the mobile device (and relay device) have been out of coverage or asleep for a while.

The methods according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc.

The computer program product in a non-transient form may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is also provided a computer program product in a transient form downloadable from a network and/or stored in a volatile computer-readable memory and/or microprocessor-executable medium, the product comprising program code instructions for implementing a method as described above when executed on a computer.

Another aspect of the invention provides a method of making the computer program in a transient form available for downloading. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

In an aspect, the request message (M) contains multiple requested identifiers (IDx), and whereby a relay device excludes any of the requested identifiers from the transfer request message (M') if those requested identifiers are configured in the relay device.

In an aspect, the requested identifier (ID1) indicates a generic network slice which the mobile device (110) is requesting access to and request message (M) further contains a second requested identifier (ID2) indicating a specific network slice that the mobile device (110) is requesting access to, and whereby the relay device performs one of the following: sends the second requested identifier (ID2) for the specific network slice, instead of the generic slice identifier (ID1) as part of the transfer request message (M')

sends both identifiers as part of the transfer request message (M') and whereby the response message (N) contains only the second requested identifier (ID2) for the specific network slice and not the requested identifier (ID1) for the generic network slice.

In an aspect, the request message (M) contains a security context identifier (ID3) indicating a security context or security key, the relay processor being arranged to send the transfer request message (M') to the cellular communication system in dependence of the request message only if the security context or security key indicated by the security context identifier (ID3) corresponds to a security context or security key which is configured in the relay device, and not send the transfer request message (M') if there is no match.

In an aspect, the indirect connection to the requested slice is setup over the same logical data connection via which the request message (M) and response message (N) are sent, said logical data connection being at least one of a PC5 connection, sidelink connection, or D2D connection.

In an aspect, the requested identifier (ID1) is used by the NRF to retrieve a set of PDU session parameters that includes a network slice identifier, and the NRF configures a PDU session of the relay device and/or mobile device according to at least one of the parameters in the retrieved set of PDU session parameters.

In an aspect, the requested identifier (ID1) is used by the NRF to retrieve a set of PDU session parameters that includes an identifier denoting a non-public network, the NRF configures a PDU session of the relay device to connect to a cellular base station (BS) which is configured to broadcast the identifier denoting the non-public network as part of its system information and/or which is configured to report the identifier denoting the non-public network to the core network (CN) if the relay device connects directly or the mobile device connects indirectly via the relay device to that cellular base station.

In an aspect, the requested identifier (ID1) is used by the NRF to contact a different Public Mobile Land Network (PLMN) to retrieve a set of PDU session parameters that includes a network slice identifier.

In an aspect, the transfer response message (N') comprises network relay information indicating a set (T) of relay devices and/or the response message (N) comprises a set (T) of relay devices.

In an aspect, the network relay entity is arranged to determine that there are no relay devices capable of transferring data of a slice accommodating the requested identifier to, and from, the mobile device, and upon so determining, to send a slice denial to the relay device and/or the mobile device, the slice denial message indicating that there are no relay devices capable of data transfer for a slice accommodating the requested identifier.

In an aspect, the network relay entity is arranged to determine that the indirect connection engaged from the mobile device via the selected relay device is addressed to the requested slice and if it is addressed to a different slice, perform one or more of the following actions:

send a PDU session reject message to the remote UE via the indirect network connection send a slice denial message to the relay device and/or mobile device.

reconfigure the relay UE.

terminate the relay connection,

In an aspect, the connection processor in the mobile device is arranged to initiate a relay discovery process and to engage an initial indirect connection, and subsequently to send the request message via the initial indirect connection; and wherein the network relay entity (140) or the relay function is arranged to reconfigure the initial indirect connection to said indirect connection to the selected slice via the selected relay device.

In an aspect, the relay processor in the relay device is arranged to send a preliminary response message (N**) to the mobile device in dependence of the request message (M); the preliminary response message indicating that the relay device is present but that the response message (N) in dependence of the transfer response message (N') will be sent later based on the network relay information.

In an aspect, the requested identifier comprises a set of requested network slices, and wherein the network relay entity (140) is arranged to determine at least one subset of available slices accommodating the requested set of network slices and at least one relay device capable of transferring data of the subset of available slices and/or the response message (N) contains the determined subset of available slices, upon which the mobile device selects one of the available slices to engage in indirect connection to the selected slice via the relay device from which it received the response message (N).

In an aspect, the network relay entity (140) is arranged to determine additional relay capability data regarding at least one relay device, the additional relay capability data indicating a preference or suitability to serve as relay;

the transfer response message (N') comprising, in the network relay information, the additional relay capability data; and/or the response message (N) comprising at least part of the additional relay capability data.

In an aspect, the network relay entity (140) is arranged to determine multi-hop relay capability data regarding at least one multi-hop indirect connection via multiple hops using multiple relay devices, the multi-hop relay capability data indicating available slices via the multi-hop indirect connection;

the transfer response message (N') comprising, in the network relay information, the multi-hop relay capability data; and/or the response message (N) comprising at least part of the multi-hop relay capability data; or wherein the network relay entity (140) is arranged to determine the available relay devices for the requested slice based on the achievable QoS; or to determine which relay devices are preferred to be used in dependence of properties or requirements of the respective slice.

In an aspect, the request message comprises one or more of the following:

security information about security credentials or a security context in which the mobile device operates or requires to operate in for the indirect connection or related to the requested identifier;

status information indicating why a relay is requested;

received signal strength of messages received from nearby devices;

power information of the device regarding the power source of the mobile device.

In an aspect, the network relay entity (140) is arranged to obtain metadata from the cellular communication system such as received signal strength, signal quality or a distance estimation; or wherein the transfer request message comprises metadata identifying the current connectivity state, such as manner of network connection, quality of service (QoS) and number of hops, connection stability information and/or frequency bands being used or supported frequency bands of the relay device, and wherein the network relay entity (140) is arranged to determine the transfer response message in dependence of the metadata.

There is provided a method for use in the cellular communication system, the method comprising steps to perform, in the mobile device, the relay function comprising managing at least one indirect connection, sending a request message (M) to at least one relay device (UEx), the request message including a requested identifier (ID1) indicating a network slice which the mobile device (110) is requesting access to;

receiving at least one response message (N) from at least one relay device, the response message indicating at least one available slice for relaying via at least one relay device for providing an indirect connection;

selecting, in dependence of the response message, a relay device (UEy) from the at least one relay device; and engaging the indirect connection to the requested slice via the selected relay device.

In an aspect, the method comprises steps to perform, in the relay device, the function of relaying comprising managing the communication in the cellular network, managing an indirect connection between the mobile device and the cellular network, receiving the request message (M) from the mobile device;

sending a transfer request message (M') to the cellular communication system in dependence of the request message, the transfer request message indicating a request from the mobile device to communicate with a requested slice via an indirect connection and including the requested identifier (ID1);

receiving a transfer response message (N') from the cellular communication system;

sending the response message (N) to the mobile device in dependence of the transfer response message.

In an aspect, the method comprises steps to perform, in the network, the network relay function comprising receiving at least one transfer request message (M') via at least one cellular base station;

obtaining relay capability data regarding relay devices capable of data transfer for at least one available slice to, and from, the mobile device, the available slice being determined in dependence of the requested identifier (ID1); and sending at least one transfer response message (N') via at least one cellular base station, the transfer response message including network relay information indicating at least one available slice and at least one relay device capable of transferring data of the available slice.

There is also provided a computer program product downloadable from a network and/or stored on a computer-readable medium and/or microprocessor-executable medium, the product comprising program code instructions for implementing a method as disclosed herein when executed on a computing device.

BRIEF DESCRIPTION OF THE DRAWINGS

These and other aspects of the invention will be apparent from and elucidated further with reference to the embodiments described by way of example in the following description and with reference to the accompanying drawings, in which FIG. 2 shows an illustration of communication via Single hop (left) and Multi-hop (right) using UE-based relay devices.

The figures are purely diagrammatic and not drawn to scale. In the Figures, elements which correspond to elements already described may have the same reference numerals.

DETAILED DESCRIPTION OF THE EMBODIMENTS

Figure 3:
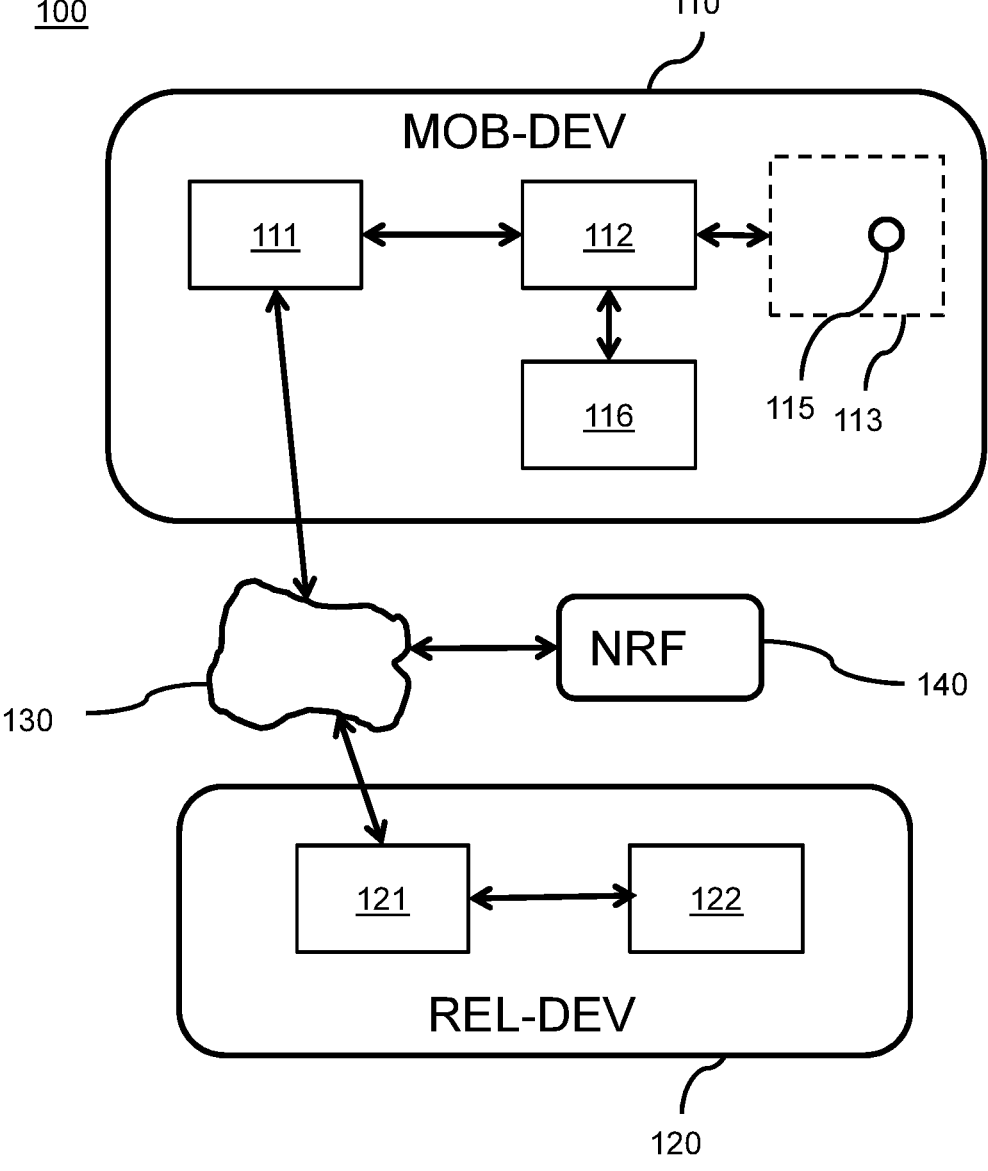
FIG. 3 shows a mobile device and a relay device and a network relay entity and a cellular communication network.

FIG. 3 shows a mobile device and a relay device and a network relay entity and a cellular communication network. In a cellular communication system 100, a mobile device 110 is arranged for wireless communication in a cellular communication network 130. The mobile device may, for example, be a mobile phone, a wearable medical device or a data communication unit embedded in a car. The cellular communication system (CCS) may include a radio access network (RAN) comprising multiple cellular base stations (BS) and a core network (CN). The cellular communication system provides a cellular network that supports network slicing and indirect connections.

Each network slice provides a logical network using a shared physical infrastructure of the cellular communication system. This is also typically the case for non-public networks (NPNs), in particular for public network operated NPNs. In case of a standalone NPN the logical network may also be deployed as a separate mobile core network and may operate a private small-cell infrastructure. Shared means that the physical infrastructure may be fully or partly shared. For example, some network functions of a first slice or NPN may be software running on other computers than the network functions of a second slice or NPN, while the RAN components may be fully shared between both slices or between both NPNs. Also, a first slice or NPN may be assigned to different frequency bands than a second slice or NPN, whilst the RAN components may be fully shared. Each indirect connection provides data transfer between a mobile device and the cellular communication system via at least one relay device. Another typical characteristic of network slices is that the network traffic related to a slice is isolated from other network traffic. The same holds for standalone NPNs.

Figure 1:
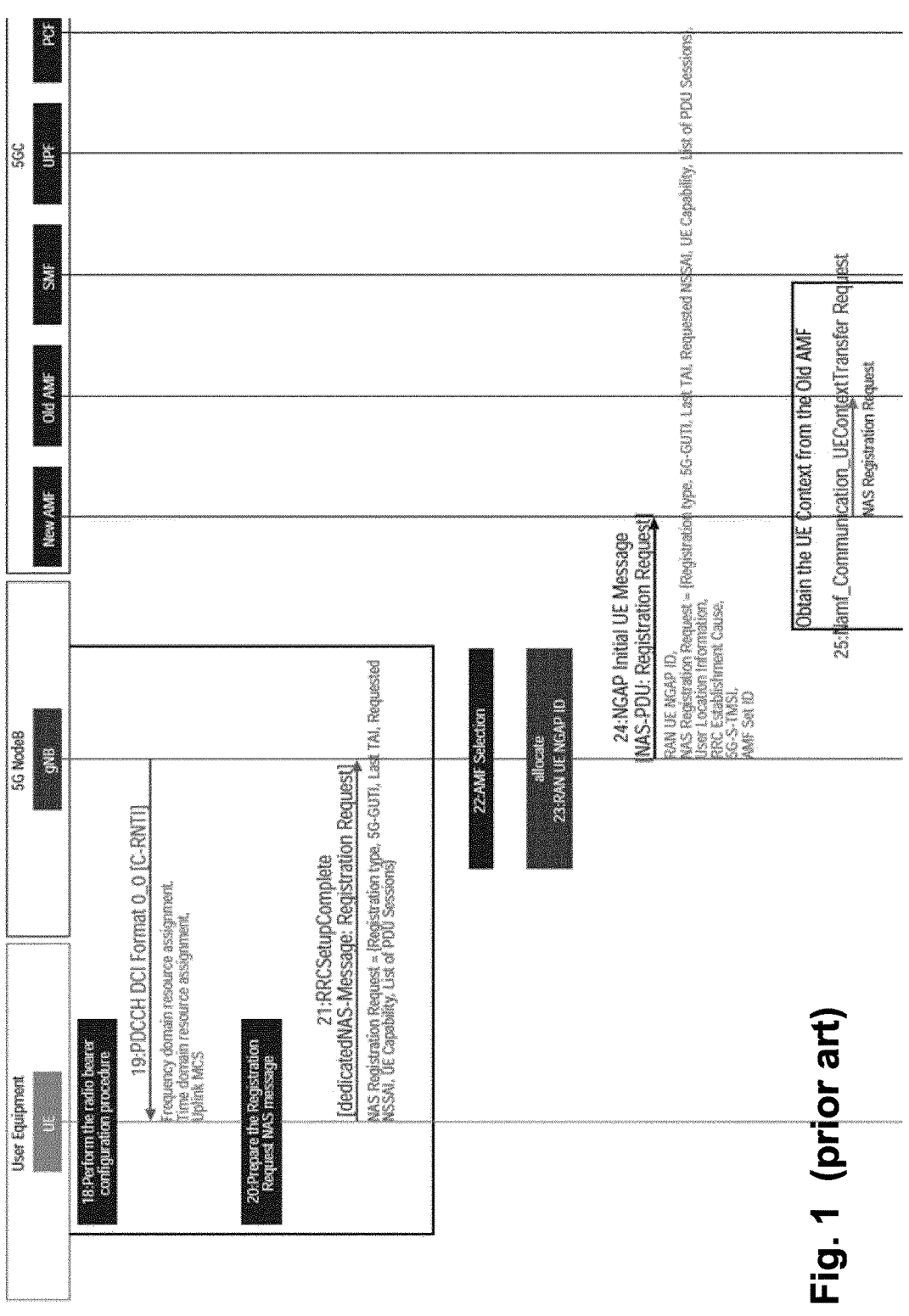
FIG. 1 shows an excerpt from a diagram showing User Equipment (UE) requesting a slice.

As elucidated in the introduction, the cellular communication network may be an enhanced 5G network. FIG. 1 schematically shows the network 130 for providing communication between the mobile device MOB-DEV 110 and the relay device REL-DEV 120. The core network may be managed by at least one telecom provider, e.g. for managing a subscriber database and invoicing.

The network may also be coupled to network relay entity 140 providing a network relay function (NRF) for managing the indirect connections. The network relay entity may be implemented on a processor system, e.g. provided at the core network, in the radio access network, or on a separate server on the Internet. The entity may be coupled wirelessly and/or wired, or via a dedicated link, to the network.

The relay device may be a mobile device arranged for communication with the radio access network and capable of supporting an indirect connection for data transfer to, and from, a mobile device. Note the difference with the multitude of indirect connections mentioned above that the NRF manages. The NRF might manage the indirect connections of 1000's of UEs while the relay device only manages the indirection connection(s) of a mobile device in its vicinity.

The mobile device 110 may be arranged for wireless communication with the network, and has a transceiver 111 arranged for the wireless communication, and a connection processor 112 arranged to control the mobile device and provide an interface to the user. The connection processor may be arranged for managing connections to the cellular network, and provides a relay function 116 for managing at least one indirect connection as elucidated below. The mobile device may be provided with a user interface 113, e.g. including a display and one or more user input elements 115. For example, the user input elements may comprise one or more of a touch screen, various buttons, a mouse or touch pad, etc. Buttons may be traditional physical buttons, touch sensors, or virtual buttons, e.g. on a touch screen or icons to be activated via a mouse. The user interface may also be a remote user interface.

The relay device 120 has a relay processor 122 arranged for managing the communication in the cellular network and for managing an indirect connection to the mobile device as elucidated below, and a communication unit 121 arranged for wireless communication with the network.

In the mobile device, the relay function may be arranged to perform the following. First a request message (M) is sent to at least one relay device (UEx). The request message may include a requested identifier (ID1) indicating a network slice which the mobile device is requesting access to. Next, at least one response message (N) is received from at least one relay device. The response message may contain an indication of at least one available slice for relaying via at least one relay device for providing an indirect connection. This indication may be explicitly defined (e.g. as part of an additional 'slice relay information' field in response message N), or implicitly (e.g. message N being an acknowledgement confirming the requested slice can be relayed via the respective relay device). Then, in dependence of the response message, a relay device (UEy) is selected from the at least one relay device that supports the requested slice. The response message may also include information about additional slices that can be supported from which the remote UE may make a selection. In the event that the remote UE is restricted to only a single, e.g. private, slice, or if there is only one available slice that is suitable for the UE, the selection is effectively taking such single slice. If the selected slice is the same as the requested slice, the remote UE may select the respective relay UE from which it received a response, and may reuse the same device-to-device (D2D) connection (e.g. PC5) between the remote UE and the relay UE for setting up the indirect connection to the network via the relay UE. In the event that there only is a single, available relay UE that is suitable for the remote UE, the selection is effectively taking such single relay UE. Then, an indirect connection is engaged to the selected slice via the selected relay UE, which may reuse the same D2D connection between the remote UE and the relay UE used for sending request message (M) and/or receiving response message (N).

In the relay device, the relay processor may be arranged to perform the following. First the request message (M) is received from the mobile device. Then, a transfer request message (M') is sent to the cellular communication system in dependence of the request message. The transfer request message indicates a request to transfer data via an indirect connection to, and from, the mobile device. The transfer request message includes the requested identifier (ID1). The transfer request message may be either the same as message M, or may be a newly constructed message by the relay device based on information received in message M, or may be a message that encapsulates the contents of message M (e.g. as part of an IPSec tunnel, or by adding/changing some routing headers), or a variation thereof. The identifier that is sent as part of the transfer request message (M') may be a copy of the requested identifier (ID1), or may be an encrypted, encoded, hashed and/or scrambled of ID1, or may be a one-to-one mapped replacement identifier.

Then, a transfer response message (N') is received from the cellular communication system, the message being elucidated below. Then the response message (N) is sent to the mobile device in dependence of the transfer response message.

In the network relay entity, the network relay function (NRF) is arranged to perform the following. First at least one transfer request message (M') is received via at least one cellular base station. Then relay capability data is obtained regarding relay devices capable of data transfer for at least one available slice to, and from, the mobile device. The available slice(s) are determined in dependence of the requested identifier (ID1). Next, at least one transfer response message (N') is sent via at least one cellular base station. The transfer response message includes network relay information indicating at least one available slice and at least one relay device capable of transferring data of the available slice.

Optionally, the transfer response message (N') comprises, in the network relay information, a set (T) of relay devices. Also, or alternatively, the response message (N) comprises (e.g. in a slice relay information field), a set (T) of relay devices. For example, the set of relay devices may be an ordered list of available relay devices, e.g. ordered on preference level or suitability.

Optionally, a respective transfer response message may only go to one specific relay device and a response message may indicate the relay device itself as the relay device. Such messages may only implicitly indicate that relay device. So the message may not explicitly indicate a relay device in a some 'Relay ID' or similar message element. Instead, the message may, e.g., only include the network address of the specific relay as a destination address in the message header. The relay device may be implicitly indicated by a destination address of the relay (e.g. in case of a transfer response message (N')) or by a source address of the relay (e.g. in case of a response message (N)). For example, a use case may have 3 relay devices a, b, c that each respond to the mobile device's broadcast with information about their own slice(s) they can support towards mobile device. Then the message N doesn't need to list any relay (capable) devices, because each relay (a/b/c) answers on its own behalf. In the message format in this case the identity of the relay (a/b/c) may only be found in the standard 'source' field in the message headers, e.g. the MAC source address. It may be absent in the higher-level message or it may be indicating itself. The mobile device selects one of the relay devices from which it received the respective response messages, and engages an indirect connection via the selected relay device.

Optionally, a respective transfer response message comprises instructions for various actions. There may be instructions to reconfigure an existing PDU session between the relay device and the network to accommodate relaying network traffic for a particular slice (e.g. change the DNN, connect to different User Plane Function), to update the UE configuration (possibly including information such as different S-NSSAI information, different policy information, different credentials) which will trigger the device to reconnect to the network by breaking the existing PDU session and setting up a new PDU session, which may lead to selecting a different Access and Mobility management Function (AMF) to serve the network slice. The transfer response message may include instructions to initiate additional PDU sessions with the network, in case the Relay UE is already serving other Remote UEs, and may also include instructions to connect to a different PLMN/NPN. The transfer response message may also include instructions to camp on specific cells related to a Closed Access Group (CAG) ID to access a slice, in particular in case of a public network operated NPN.

Optionally, a respective transfer response message comprises, in the network relay information, instructions/information on resource scheduling requirements for the base station based for the available slices (e.g. related to the characteristics, QoS flows, minimum/maximum/preferred bitrates, priorities, frequency bands, bandwidths, division of resources across different slices), the resource scheduling requirements being used by the base station to schedule sidelink resources for the mobile device and the available relay devices or the selected relay devices for communication of the available or selected slices. Alternatively, the instructions/information on resource scheduling requirements for the base station based for the available slices may be sent as a separate message from the NRF to the base station (or a nearby base station) either directly or routed/tunneled via the AMF.

Optionally, the respective transfer response message may comprise some configuration update information or authorization update information or policy update information for the Remote UE that has been out of coverage for a while. This information could be forwarded by the Relay UE to the Remote UE using response message N. This information may be encrypted using security credentials only known to the Remote UE to prevent this information to be exposed to the Relay UE In a detailed embodiment, a cellular communication system involves a mobile device UE0 operating as cellular communication User Equipment, a set S of relay devices {UE1, . . . UEn}, n>=1 operating as cellular communication User Equipment and further being capable of relaying network traffic from UE0 to/from a cellular communication system CCS capable of supporting relay operation and network slicing.

Device UE0 may operate as follows.

Device UE0 sends a message M to a relay device UEx of set S. The message includes an identifier which may be a network slice identifier ID1 which device UE0 is requesting access to. ID1 may be an S-NSSAI (as defined in 3GPP [24.501]) optionally being part of a set of slice identifiers. Alternatively, the message may include a temporary slice identifier (as defined in 3GPP [33.813]) (complete or as a hash value), or an encrypted slice identifier (as defined in 3GPP [33.813]). Note that in such a case, it would be convenient that the core network keeps a list of previous temporary identifiers to see if there is a match, since the remote UE may have been out-of-coverage for a while, and hence the temporary identifier may not be up to date anymore. Alternatively, the message may include a combination of PLMN and a Network Identifier (NID) or a CAG ID, to denote a slice, in particular in case of NPN. The message may include any other type of identifier (e.g. pre-configured in the UE, or regularly updated upon or after registration, or derived from a derivation function or mapping table that may be uniquely pre-configured for each UE) from which the NRF (e.g. AMF/NSSF/ProSe function or other network function) or relay device Ux can derive (e.g. using hash table or other type of mapping function) which slice is requested by device UE0.

Message M may e.g. be a D2D/PC5 discovery message (as defined in 3GPP [23.303]) with an additional information element to indicate a requested network slice identifier, or a PC5 Direct Communication Request (as defined in 3GPP [23.287]) with an additional information element to indicate a requested network slice identifier, or by using the requested identifier (ID1) as (V2X) service code or application ID, or a PDU Session Establishment Request (as defined in 3GPP [24.501]) with an additional information element to indicate a requested network slice identifier, or a Registration request (as defined in 3GPP [24.501]) using existing 'Requested NSSAI' attribute, or UL NAS TRANSPORT (as defined in 3GPP [24.501]) using existing 'S-NSSAI' attribute, or another type of PC5NAS/RRC message with an additional information element to indicate a requested network slice identifier.

Device UE0 receives a message N from device UEx. In one embodiment, the message includes a network slice identifier ID2, for example as part of an additional slice relay information field. ID2 may be the same as ID1, or an instance identifier, or an allowed slice identifier, or a default slice identifier. In another embodiment, message N may include information about a subset S' of S that UE0 is allowed or not allowed or preferred to use for setting up an indirect connection session with the network slice of cellular communication system CCS identified by ID2. In another embodiment, message N includes a boolean or set of boolean values indicating support for a set of requested and/or supported slices. In yet another embodiment, message N is an acknowledgement that a match has been found between a requested slice and a list of slice IDs that the mobile device can connect to via the eRelay UE. In a further embodiment, Message N may only be sent if it is possible for relay device UEx to act as relay for device UE0 for an indirect communication session within the requested network slice. Message N may be formatted e.g. as a D2D/PC5 discovery response message (as defined in 3GPP [23.303]), or a PC5 Direct Communication Accept message (as defined in 3GPP [23.287]), or a PDU Session Establishment Accept message (as defined in 3GPP [24.501]), or a Registration Accept message (as defined in 3GPP [24.501]), or DL NAS TRANSPORT (as defined in 3GPP [24.501]) using existing 'S-NSSAI' attribute, or another type of PC5NAS/RRC message.

Device UE0 selects a relay device UEy of set S for communicating with the cellular communication system CCS. UEy may be different from UEx, if device UEx is not allowed or not preferred to be used for setting up an indirect connection with the requested network slice.

It is noted that, optionally, the relay UE may reply via message N on its own, e.g. based on preconfigured information from the NRF, that it can serve a certain slice, e.g. because it is part of the same slice, has the same security context, and has sufficient resources to act as relay for the remote UE. This option could work also for a default slice, e.g. operating in the same PLMN, and for relays that operate in a private slice, e.g. operated and configured by a same third party to be part of the same group, or belong to a special group of devices, e.g. Public Safety UEs. Optionally, the NRF may preconfigure a relay UE for a set of slices, e.g. default slice and/or specific private slice that relay UE can operate in, and optionally for related policy rules, for example when the relay UE is authorized, enabled or gets resources to reply to relay discovery messages. This may for example be done by sending a message containing preconfigured slice relay information to the relay UE beforehand.

Relay devices UEx (1<=x<=n) may operate as follows.

Device UEx receives a message M from Device UE0, the message including a network slice identifier ID1 which device UE0 is requesting access to.

Device UEx sending a message M', at least partially based on message M, to cellular communication system CCS, either directly or via one or more other relay devices UEy (1<=y<=n);

Device UEx receiving message N' from cellular communication system CCS, the message including a network slice identifier ID2 and information about a subset S' of S that UE0 is allowed or not allowed or preferred to use for setting up a relayed communication session with the network slice of cellular communication system CCS identified by ID2;

Device UEx sending message N, at least partially based on message N', to device UE0.

Message M' may be, for example, a ProSe match report (as defined in 3GPP [24.334]) or another message over the PC3 interface with some additional field(s) to indicate information about the requested slice by UE0, or a NAS message (as defined in 3GPP [24.501]) with some additional field(s) to indicate information about the requested slice by UE0. In case of layer 2 relay, message M' may be the received PDCP frame containing the NAS message as received from device UE0 that is transparently forwarded by the relay device UEx over its Uu interface to the base station/core network (or other PC5 interface to a subsequent relay device). It may also be a new dedicated NAS or RRC message (e.g. relay request message) containing the required information about the requested slice by UE0.

In the cellular communication system CCS the relay device UEx may be communicatively coupled via a base station BS of the multiple cellular base stations of the RAN. In the CCS a network relay function (NRF) is provided. The base station may be communicatively coupled to an Access and Mobility Management Function (AMF) in the CN. The core network may host multiple Access and Mobility Management Functions assigned to different slices. The base station may select the proper AMF based on the requested slice identifier ID1 received in message M'.

The base station BS may be able to receive message M' from relay device(s) UEx, and may either forward the message to the NRF or AMF, generates a new message to the NRF or AMF based on the received message, or interprets the message M' via the NRF, e.g. through a built-in NRF. The forwarded message may be a NAS message. The new messages may, e.g., be initial registration messages, UE context information messages or other NG Application Protocol (NGAP) messages over the N2 interface similar to the S1 Application Protocol S1AP over the S1 interface in 4G.

The CCS may also host different network relay functions or different instances of the NRF may be assigned to different slices. The base station may select the proper NRF based on the requested slice identifier ID1 received in message M' and forward the message to the selected NRF. In case the NRFs are not directly coupled to the base station, but to the AMF, the AMF may select the proper NRF based on the requested slice identifier ID received in the message it receives from the base station.

In the CCS the network relay function (NRF) may operate as follows.

a message M', or a message M'' at least partially based on message M', is received from the Access and Mobility Management Function (AMF) or directly from the base station BS, the message including a network slice identifier ID1 which UE0 is requesting access to;

information I is obtained about a set T of UEs capable of relaying network traffic from UE0 to/from the RAN, and the capabilities of these UEs;

relay devices are determined, in part based on the received message M'' and the obtained information I. The relay devices may constitute a subset T' of T consisting of UEs that UE0 is allowed or not allowed or preferred to use as a relay device for setting up a relayed communication session with the network slice of cellular communication system CCS identified by ID1;

a message N'' may be sent back to the AMF or to base station BS. The message N'' may include information about subset T' and a network slice identifier ID2.

Finally, the AMF or base station BS, send a message N', at least partially based on message N', to relay device UEx. Note that the message may, also or alternatively, be addressed directly to the remote UE (e.g. through the AMF), or the subset of relay UEs, or may be addressed to an intermediary node, e.g. a Base Station to which said relay UE is connected, which then forwards the information in a new message to the relay UE.

In an embodiment NRF-assisted relay selection is described via a requesting UE during discovery, where UE selects based on NRF preselection. In the embodiment, a UE may be configured to connect to one or more network slices, and may be further configured to discover nearby relay capable UEs under certain circumstances, e.g. out-of-coverage of the base station, based on a configured policy. In order to discovery nearby relay capable UEs, the UE sends a D2D/PC5 discovery message that includes a new attribute indicating one or more IDs of slices that it wants to connect to. The relay capable UEs in radio range will receive this message, and may each report the information from the message to the network relay function (NRF) in the Core Network (CN). The message specifically includes the information of the ID(s) of slice(s) that the UE is requesting.

From the received information, NRF determines which (potential or already-active) candidate relay UEs are able and/or allowed and/or would optimally serve the requesting UE with the requested slice(s), or a subset thereof if the full set is not attainable. To this end, the NRF may need to request/receive information from other network functions (such as Access and Mobility Management Function (AMF) or the Radio Access Network (RAN)) or request/receive information directly from the relay UE, further details about the capabilities, context information, connectivity properties, and other information such as mobility/location/speed information from each of the relay capable UEs within discovery range of the UE, or that are otherwise capable or involved in (e.g. in case of multi-hop relay) setting up an indirect connection from the UE to the Radio Access Network. The NRF may use this information together with other information it may request/receive from other network functions, such as the Policy Control Function (PCF), Unified Data Management (UDM), Network Slice Selection Function (NSSF), . . . ) to assess whether or not each of these candidate relay UE is allowed, capable, and has sufficient resources available and would be able to attain the required QoS to serve as relay UE for the requested network slices. In addition, the NRF may request information about the 'reputation as relay UE', e.g. from the Network Data Analytics Function (NWDAF), since the relay UE can have a 'bad reputation' (or record) when it comes to serving as relay, e.g. it may drop connections, perform denial-of-service by ignoring all the remote UE's traffic, throttle the bandwidth of the remote UEs, etc.

In addition, the NRF may take other criteria into account such as RAN congestion or whether a base station or AMF/MME to which a candidate relay UE connects to is close to or has already reached a certain maximum number of UEs/PDN connections per slice, and may provide a different candidate relay UE for the requesting UE to connect to.

Also, the NRF may use preliminary UE subscription information to check whether the UE is allowed to operate in the slice(s) it requested. Note: because the UE did not authenticate yet with the core network at this point, and it only sent information related to its identity via the relay discovery request, which may be unauthenticated data (i.e. could be easily forged/changed), the NRF does not use this information to authenticate the UE. But only as guidance in the selection process.

When the Network Relay Function (NRF) receives the requested identifier (ID1) in a transfer request message (M') it may use ID1 to obtain relay capability data regarding relay devices capable of data transfer to/from a specific network slice based on the characteristics of that network slice indicated by ID1. However, in case of a roaming Remote UE the NRF may not know the identifier ID1 nor the characteristics of the slice indicated by it. Or, the NRF does know the identifier ID1 but with different slice characteristics because the identifier ID1 is used by both the operator of the Relay UE and the operator of the Remote UE for different purposes. In other words, there may be overlap between identifiers if operators do not use a mutual agreement on the values of identifiers such as ID1. To solve these potential issues, a NRF may after receiving M' contact the NRF of the Home PLMN (HPLMN) of the Remote UE (if known) or may contact the AMF (or database) of one or more other PLMNs, using for example a request message M" to the HPLMN NRF, to obtain the characteristics of the slice indicated by ID1 and may also validate if the Remote UE is authorized to connect to the slice indicated by ID1. Once the characteristics of the slice are retrieved, for example via a response message N" from the HPLMN NRF, then the NRF may configure the Relay UE with parameters to support relaying for the slice indicated by ID1, for example sending the Relay UE a security key or parameter from which the Relay UE may derive a security key. The NRF may include such configuration information fully or partially into the transfer response message N', or it may include configuration information in other, separate messages. The NRF may also configure the PDU session of the Relay UE and/or Remote UE in dependence of the retrieved characteristics of the slice indicated by ID1, for example to optimally meet the QoS service requirements of the particular slice. Also, the NRF may configure parameters on the gNB that is serving the Relay UE, for example to optimally meet the QoS service requirements of the particular slice which may include communication latency requirements or data throughput requirements.

Another solution is to coordinate the allocation of identifiers such as ID1 between operators, for example an operator makes agreements with all operators for which it enables roaming of UEs from the other operator on its own cellular network(s).

The NRF may then send a message back to one or more chosen candidate relay UE(s) with the message for each relay UE including a set of slices that can be offered to the requesting UE via that specific relay UE. In other words, for each candidate relay UE a set of 'Accepted slice IDs' is included. The NRF may also include a set of 'Rejected slice IDs' in case the full set of requested slices was not attainable, or if the relay UE is not allowed to be used as relay UE for network communication of the requested slice. The received slice information can also be an instance identifier, or an allowed slice identifier, or a default slice. Optionally, the message may contain information about a list of other possible candidate relay UEs that could be used to set up an indirect connection to the core network in order to gain access to the requested slice. This list may be ordered according to preference or suitability to serve as relay UE for the requested slice.

Each relay UE that receives such message will then use the information from the message to send a discovery response back to the requesting UE, optionally containing the slice information (or other information from which the requesting UE can derive whether the relay UE can support relay communication for a requested slice), and optionally the information about other candidate relay UEs. Because a (potential) relay UE communicates with NRF before sending a discovery response to the requesting UE, the discovery response by the relay UE could potentially be sent a bit later than expected by requesting UE. In this case the relay UE can send a preliminary discovery response, indicating that it is present but that further information including slice information is still to be sent later, pending NRF/CN approval.

Based on the received discovery responses it received from candidate relay UE, the UE can now select the best candidate relay UE to connect to, and then connects to it, e.g. by procedures similar to ProSe, and via Core Network procedures it connects to the requested slice(s) or the attainable subset thereof. Alternatively, the NRF selects only a single relay UE and instructs the relay UE to connect to the UE requesting a relay connection to the requested slice.

Figure 4:
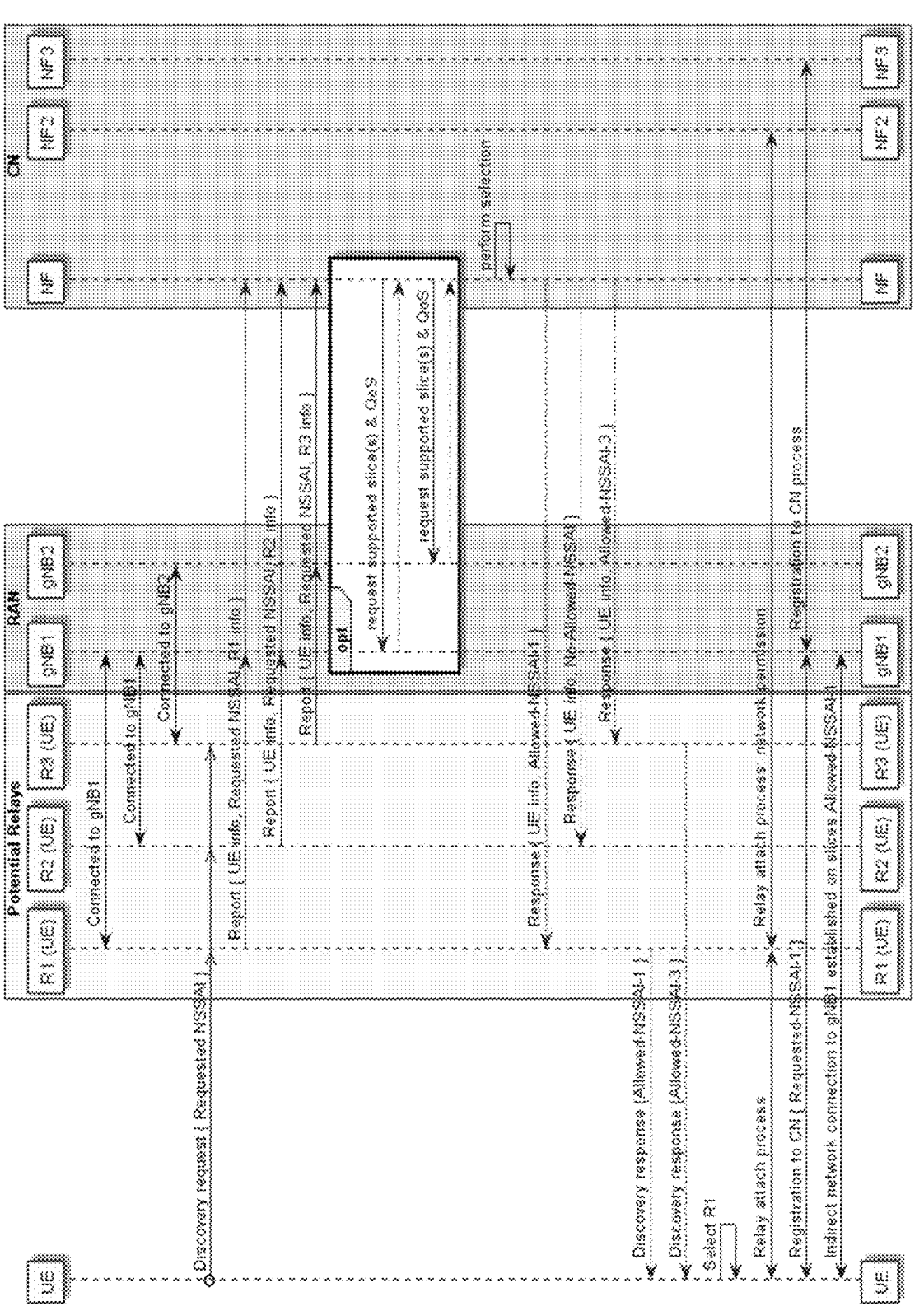
FIG. 4 shows an example of an NRF-assisted relay selection sequence diagram.

FIG. 4 shows an example of a NRF-assisted relay selection sequence diagram. The Figure schematically provides an example flow and message sequence. In the Figure NF is the network relay function NRF as described above;

NF2 is an optional extension to the NRF (or the ProSe function) that handles providing permission for a relay UE to accept a new remote UE;

R1, R2, R3 are relay UEs or potential relay UEs; assumption here is that R3 is connected to a different gNB, i.e. gNB2. In this example message sequence, detailed information about each relay UE (e.g. capabilities, signal quality, etc.) is sent directly to the NF, to reduce the time for the NF to acquire all this information;

The 'opt' box denotes optional communication to request further information about slices, QoS, but possibly also information about other potential relay UEs in vicinity, measurement information, location/mobility information of the different UEs, etc. from RAN. Currently it is shown as information to request from RAN, but information may also need to be requested from the AMF, PCF, UDM, NSSF, or other network functions. It is shown as optional since, the NRF may already have received this information beforehand;

NSSAI is a set of up to 8 slice IDs, as further described in 3GPP specification [23.501].

In a further embodiment of the cellular communication system, the connection processor in the mobile device may be arranged to initiate a relay discovery process and to engage an initial indirect connection. Subsequently, the connection processor sends the request message via the initial indirect connection. The network relay entity (140) or the relay function may be arranged to reconfigure the initial indirect connection to said indirect connection to the selected slice via the selected relay device. So, an active relaying UE may be reconfigured to uses another relay, where the UE initially selects an initial relay and the NRF or the UE reconfigures the selection. In the embodiment, a UE that needs to select a relay UE sends a D2D/PC5 message to initiate relay discovery. Relay UEs and potential relay-capable UEs in radio range will receive this message and will respond with a discovery response using state-of-art procedures, possibly ProSe procedures. Then the UE picks a suitable relay UE candidate, even without yet knowing if this relay UE will fully support all its required slices, and connects to it. Over the relay UE connection, 5G network registration and/or a PDU session establishment is performed by the UE using state-of-art procedures, which includes a request for one or more slices.

The NRF may be involved in the process as follows. Once the NSSAI requested by the UE is received by a base station or the Access and Mobility Management Function (AMF), the NRF may be informed about this, after which the NRF may determine which (potential) relay UE or set of relay UEs are able and/or allowed and/or would optimally serve the requesting UE with the set of requested slices, in the same manner as described for the first embodiment. Then, if the NRF determines that the most suitable relay UE for the UE requesting access to one or more slices is another relay UE than the current one it sends a reconfiguration message (e.g. CONFIGURATION UPDATE COMMAND as defined in 3GPP [24.501]) to UE. The message may be sent directly or addressed via intermediaries like gNB or relay UE, and may indicate in a new attribute in the message the ID or the address of the relay UE to use preferably and the set of slices that are attainable with that relay UE. The set may be larger than the current supported slices for UE. In addition, the NRF may also send a list of relay UEs along with preference level and/or set of slices for each. Alternatively, information about which relay UEs may or should be used for a specific slice can be provided as a new extension to the UE route selection policy (URSP) as defined in 3GPP [29.507] [23.503], which can be sent to the UE using the UE policy delivery protocol defined in Annex D of 3GPP [24.501].

Upon the UE receiving the reconfiguration message or the updated URSP, and depending on the information received, the UE may either continue using the relay UE it is already using, or it may need to perform relay UE discovery again, optionally by specifically searching for the new preferred relay UE during this discovery, and connect to it.

In a further embodiment, an enhanced ProSe (eProSe) scenario in 5G is described, which embodies a reconfiguration to another eRelay UE (enhanced relay UE) that better supports the requested slices. The example scenario illustrates how the embodiment may apply to the 5G system architecture. The scenario assumes that relay capable devices have already activated their relay function, thus are acting as relay device with permission of the 5G network. On-demand activation of relay function in relay capable devices is also possible, but is not further described.

The example eProSe scenario involves the following. A mobile device UE that has lost its connection to the 5G Core Network and is unable to reestablish it, starts a procedure of eProSe eRelay Discovery model B using eRelay Open Discovery. The mobile device executes the role of eRemote UE in this procedure. The mobile device first checks in its UE configuration if authorization for doing this procedure is granted, by the ProSe Function, for out-of-coverage situations. If this is the case, it checks in its UE configuration if the ProSe Function authorized it to act as an eRemote UE when out-of-coverage. If that is also the case, it sends a PC5_DISCOVERY message of type eRelay Discovery Solicitation to request nearby eRelay UEs (which may also be called eProSe UE-to-Network relay UEs). This message is sent via sidelink (SL) spectrum resources. In this example, Open Discovery is used which means the broadcast request is not protected by encryption: any eRelay UE can parse the request without requiring a specific security context or key. In an alternative embodiment, not further detailed here, the secure discovery procedure called eRelay Restricted Discovery may be used to prevent potential leakage of information.

Subsequently, each eRelay UE reports the received information and/or request parameters from the mobile device to the ProSe Function using a message such as for example ProSe MATCH_REPORT over the PC3 interface, or the 5G eProSe equivalent thereof. The ProSe Function collects all the MATCH_REPORT messages that are sent by eRelay UEs. It determines per message what the response should be and sends each response message back to the respective eRelay UE, using for example the MATCH_REPORT_ACK message over the PC3 interface or the 5G eProSe equivalent thereof. Each eRelay UE that receives such message (i.e. the message that is e.g. implemented as MATCH_REPORT-_ACK over PC3) will based on its contents send a response message to the mobile device. That response message is e.g. implemented as a PC5_DISCOVERY message of type eRelay Discovery Response over interface PC5-D. The mobile device receives this message from one or more eRelay UEs, which allows it to select one eRelay UE that seems suitable to connect to using e.g. the decision process already standardized for 4G ProSe or the 5G eProSe equivalent thereof.

Subsequently, using the selected eRelay UE, the mobile device continues the 5G Core Network attachment procedure where the communication is relayed by the selected eRelay UE at MAC layer, that is, L2. This procedure may, for example, include the mobile device, in its role as eRemote UE, sending an INDIRECT_COMMUNICA-TION_REQUEST message to the eRelay UE over PC5, based on which the eRelay UE sends a message to a relevant network function which could be implemented as sending a UE triggered Service Request message or similar to the Access and Mobility Management Function (AMF) or to the ProSe Function in the 5G Core Network such that the 5G core network can decide on what response is to be sent by the eRelay UE towards the mobile device. The response from the core network is sent by a 5G network function, such as AMF or ProSe Function, towards the eRelay UE, based on which the eRelay UE sends a response message such as INDIRECT_COMMUNICATION_RESPONSE to the mobile device over the PC5 interface. After a positive response that can be processed successfully, the mobile device will execute a process similar to the existing 5G core network registration process—with a main difference that the messages sent by mobile device are not sent directly to a Base Station but are relayed via the eRelay UE to a Base Station and eventually to the Core Network. The registration process starts with the 5G-NR RRC Connection Setup procedure, this procedure being finalized by the mobile device sending the RRCSetupComplete message to the Base Station that includes the NAS Registration Request. The NAS Registration Request in turn includes the element Requested NSSAI, per standard 5G procedure. Based on this procedure the Base Station (gNB) initiates the registration of the UE to the 5G Core Network which starts with forwarding the said NAS Registration Request of the mobile device towards the AMF. The NAS Registration Request, that contains the Requested NSSAI, serves as the transfer request message of the current embodiment. The AMF in this case largely implements the NRF as described herein. The AMF (potentially being aided by other network functions, e.g. ProSe Function—this would constitute a distributed NRF) determines the optimal eRelay UE that the mobile device should connect to in order to satisfy its Requested NSSAI best, and also determines the Allowed NSSAI i.e. set of slice IDs (S-NSSAI) that the optimal eRelay UE can serve. In response to the NAS Registration Request the AMF constructs the response message NAS Registration Accept, which includes a new information element per this embodiment that indicates the 'Allowed NSSAI served by the optimal eRelay UE' along with the identity/address information of the optimal eRelay UE. Note that the AMF could alternatively include multiple eRelay UEs with a set of Allowed NSSAI per each eRelay UE included, so the mobile device is enabled to select an eRelay UE from a set of multiple 'optimal' eRelay UEs. The NAS Registration Accept is delivered back to the Base Station.

Subsequently, based on the above received message, the Base Station sends a message, for example RRC Reconfiguration, which includes as a new element in that message the information about 'Allowed NSSAI served by the optimal eRelay UE' along with indication of the optimal eRelay, or alternatively a set of multiple eRelays with their Allowed NSSAI. This triggers the mobile device to evaluate the new information, to detect that there is another eRelay UE that can better serve it with the indicated slices in the Allowed NSSAI, and to restart the relay procedure by connecting via the indicated optimal eRelay UE. This process optionally can involve renewed discovery of eRelay UEs.

Additionally, the 'Allowed NSSAI served by the optimal eRelay UE' information may be complemented by an optional field for each eRelay UE that indicates which security context ID or application ID the mobile device should use to discover that eRelay UE correctly.

In a further embodiment, a second eProSe scenario in 5G is described, in which scenario slice information is present in eProSe discovery, Model B messages to enable the UE to select the optimal relay device directly. Also this example scenario assumes that relay capable devices have already activated their relay function.

The second eProSe scenario involves the following. A mobile device UE that has lost its connection to the 5G Core Network and is unable to re-establish it, starts the procedure of eProSe eRelay Discovery model B using eRelay Open Discovery. The mobile device executes the role of eRemote UE in this procedure. The mobile device first checks in its UE configuration if authorization doing this procedure is granted, by the ProSe Function, for out-of-coverage situations. If this is the case, it checks in its UE configuration if ProSe Function authorization for acting as an eRemote UE when out-of-coverage is granted. If that is also granted, it sends a PC5_DISCOVERY message on sidelink (SL) spectrum of type eRelay Discovery Solicitation to request nearby eRelay UEs (which may also be called eProSe UE-to-Network relay UEs) to respond with relay information. In this example, Open Discovery is used which means the sent broadcast request is not protected by encryption such that any eRelay UE can parse the request without requiring a specific security context or key. Alternatively, the secure discovery procedure eRelay Restricted Discovery may be used to prevent potential leakage of information but this is not further discussed. The eRelay Discovery Solicitation message may include an additional element 'Requested NSSAI' which is a list of one or more slice IDs (that is, a list of S-NSSAI) that the mobile device would like to be connected to via an eRelay UE.

Subsequently, each eRelay UE reports the received information/request including Requested NSSAI from the mobile device to the ProSe Function using a transfer request message such as for example MATCH_REPORT over the PC3 interface or the 5G equivalent thereof. The ProSe Function implements the Network Relay Function and collects all the transfer request messages. It determines for each eRelay UE which of the slices in the Requested NSSAI the eRelay UE could provide to the mobile device via an indirect connection. The determination may involve communication with other network functions e.g. RAN, Base Stations, AMF, servers containing MNO subscription information, etc. to obtain an optimal decision of slices that can be supported.

Subsequently, the ProSe Function sends a transfer response message back to each of the respective eRelay UEs, using for example the MATCH_REPORT_ACK message over the PC3 interface or the 5G equivalent thereof. This message to a given eRelay UE optionally contains an additional information element per this embodiment, 'Allowed NSSAI' which is a list of one or more slice IDs (that is, a list of S-NSSAI) that the mobile device can connect to via that eRelay UE; and it optionally contains an additional information element per this embodiment, 'Rejected NSSAI' which is a list of one or more slice IDs for which access via that eRelay UE is determined to be not feasible by the ProSe Function.

Subsequently, each eRelay UE that receives that message (i.e. the message that is e.g. implemented as MATCH_REPORT_ACK over PC3) will send a response message to the mobile device that is e.g. implemented as a PC5_DISCOVERY message of type eRelay Discovery Response over interface PC5-D that is sent to mobile device. This message now includes as new element per this embodiment the slice IDs that were included in the MATCH_REPORT_ACK, that is an optional Allowed NSSAI in case the given eRelay UE is capable of acting as eRelay UE for the mobile device for certain slice(s), and the optional Rejected NSSAI in case the eRelay UE is rejected by the ProSe Function to act as eRelay UE for mobile device for certain slice(s). Alternatively, the response message includes as new element a boolean or set of boolean values indicating support for a set of requested and/or supported slices. Alternatively, the response message is a differently formatted message acknowledging that a match has been found between a requested slice and a list of slice IDs that the mobile device can connect to via the eRelay UE. In a further embodiment, the response message may only be sent if it is possible for the given eRelay UE to act as relay for the mobile device for the requested network slice.

Subsequently, the mobile device receives this message from one or more eRelay UEs, which allows it to select for example one eRelay UE that serves all or the most network slices that it had indicated in its Requested NSSAI initially. Or alternatively the mobile device could select an eRelay UE that does not offer most network slices, but it does offer the one most important (highest priority) network slice that the mobile device would like to be connected to. Using the selected eRelay UE, the mobile device continues the 5G Core Network attachment procedure where the communication is relayed by the selected eRelay UE at L2. This procedure may for example consist of the mobile device, in its role as eRemote UE, sending first an INDIRECT_COMMUNICATION_REQUEST message to the eRelay UE over PC5, based on which the eRelay UE sends a message to a relevant network function which could be implemented as sending a UE triggered Service Request message or similar to the Access and Mobility Management Function (AMF) or ProSe Function in the 5G Core Network such that the core network can decide on the contents of the response to be sent by the eRelay UE to the mobile device. The response from the core network is sent by a network function towards the eRelay UE, based on which the eRelay UE sends an INDIRECT_COMMUNICATION_RESPONSE to the mobile device over the PC5 interface. After a positive response that can be parsed successfully, the mobile device will initiate a process similar to the usual 5G core network registration process—with a key difference that related traffic is relayed via the eRelay UE. The process starts with the 5G-NR RRC Connection Setup procedure, which is finalized by the mobile device sending the RRCSetupComplete message to the Base Station that includes the Requested NSSAI, again, per standard 5G procedure. Based on this procedure the Base Station (gNB) initiates the registration of the UE to the 5G Core Network which includes the connection to one or more network slices.

In a third eProSe scenario in 5G, the discovery process is skipped and instead a requested slice identifier is sent as part of the INDIRECT_COMMUNICATION_REQUEST message to the eRelay UE over PC5, upon which the eRelay UE, after performing a message exchange with the AMF or ProSe Function (or other network function) to confirm whether or not the eRelay UE is capable and allowed to act as relay for communication of the eRemote UE with the requested network slice, sends an INDIRECT_COMMUNICATION_RESPONSE that includes information (e.g. set of allowed slice IDs, boolean indicating support for a requested slice) to confirm that the eRemote UE can connect via the eRelay UE with the requested slice.

In another alternative, relaying may be done at layer 3 or via an application-level relay, in which case a DIRECT_COMMUNICATION_REQUEST message (e.g. as defined in 3GPP [23.287]) respectively a DIRECT_COMMUNICATION_ACCEPT message (e.g. as defined in 3GPP [23.287]) may be used instead of the INDIRECT_COMMUNICATION_REQUEST and the INDIRECT_COMMUNICATION_RESPONSE messages.

In a further example scenario, a vehicle mobile device may communicate to some destination in the network (V2X). A car UE may use V2X 5G communication on two specific slices, 'V2X' and 'entertainment', may lose its gNB coverage at some point. The car UE initiates discovery of relay UEs and finds 10 candidates belonging to different PLMNs. Two of the candidates indicate in their discovery response message specific support for both the V2X and entertainment slices. The car UE selects one of these two with the highest signal quality, and initiates a connection as remote UE to that relay UE. During the Core Network registration process both the slices are indicated as 'Allowed NSSF' for the car UE.

Figure 5:
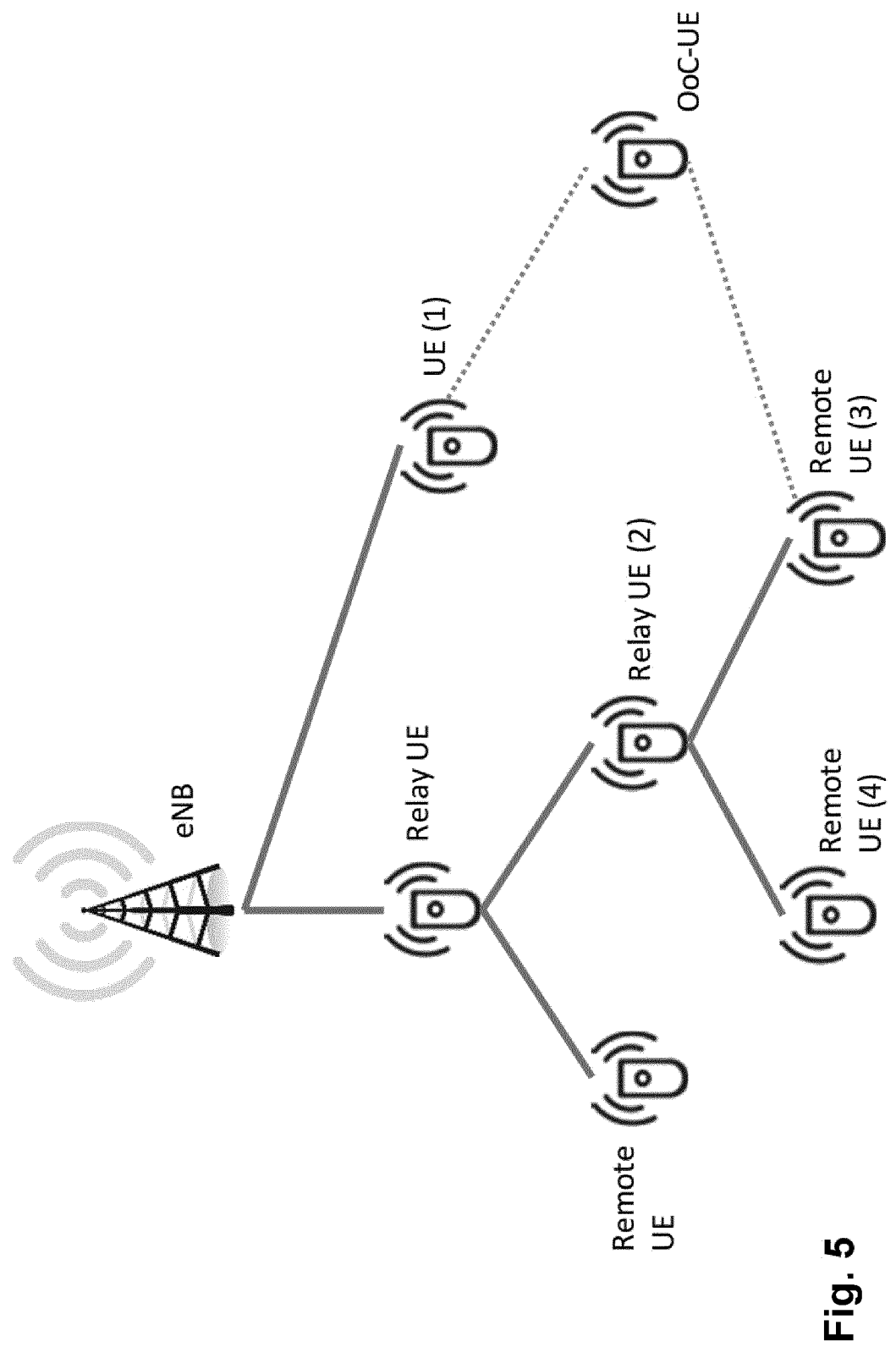
FIG. 5 shows an example multi-hop relaying topology for a moving UE.

FIG. 5 shows an example multi-hop relaying topology for a moving UE. The moving UE may have lost coverage while it was previously connected to a gNB/eNB. The Out-of-Coverage (OoC) UE may initiate a relay discovery process indicating that it requires slice X and Y. In the Figure, UE (1) and UE (3) both receive the discovery message and report the information of OoC-UE along with requested slice X/Y via the gNB to the NRF in the CN. The NRF may determine that slice X relates to Ultra Reliable Low Latency Communication (URLLC) and is best served with a minimal number of hops for lowest latency, while for slice Y high data rate is important.

The NRF determines that UE (1) has fastest connectivity to gNB and sufficient bandwidth to add the additional relayed traffic and satisfy slice Y also. Then, the NRF reports back to UE (1) with slice IDs of X and Y and a preference value 'high'. Also, the NRF may authorize UE (1) to become a relay UE to serve the OoC-UE. The authorizing may be according to a separate message/protocol, or combined with the previous step. The CN may also (at the same time) provide credentials to allow the relay UE to access the requested slice(s).

The NRF may report to UE (2) with slice IDs of X and Y and a preference value low'. Upon receiving the NRF response, UE(1) may send the discovery response to OoC-UE with slice X/Y and preference 'high'.

UE (3) may receive the NRF response and send the discovery response to OoC-UE with slice X/Y and preference low'.

The OoC-UE may receive both discovery responses and may select UE (1) as relay UE; and performs the attachment process to this relay UE. So, UE (1) becomes a relay UE during the process by executing the above procedure. It may optionally do this, when it determines there is a high probability of being selected as relay UE by OoC-UE; due to the 'high' preference value.

It is noted that the above concepts may be mapped to a 5G cellular communication system (5GS). The network relay function (NRF) may be mapped to the Network Slice Selection Function (NSSF) defined in 5G [23.501], or a combination of NSSF and AMF [23.501], but it may also be a new separate network function. Requested slices/slice instances can be mapped to Requested NSSAI [23.501] or temporary/encrypted slice identifiers [33.813] or some other newly defined identifiers. Allowed/supported slices as determined by NRF can be mapped to Allowed NSSAI [23.501]. A slice ID can be mapped to S-NSSAI [23.501] and a set of slice IDs to NSSAI [23.501].

Also, the 'discovery message' may be a discovery type message, or an announcement type message. It may be sent on Sidelink (SL) scheduled resources; or it may be a RACH (Random access channel) type message sent over Sidelink or Uplink (UL) non-scheduled resources. It may also be sent over non-3GPP defined spectrum e.g. Bluetooth, Wi-Fi.

Furthermore, a discovery message sent by requesting UE may optionally include the following. Initially, a UE may send a discovery message to find Relays or potential Relays. The contents of this message should include requested slices in an 'NRF-assisted Relay selection' embodiment, and may include requested slices in an 'NF-reconfiguring Relay' embodiment. Also, the discovery message may include either one of a message header or message type indicating that the requesting device requests another device to act as a relay for traffic originating from requester; or a message header or message type indicating that requester is aiming to discover available relay devices.

Also, the discovery message may include some information about the security context UE operates in or wishes to operate in, for example a slice specific security context, an encrypted credential provided by eNB, an encrypted PLMN session key, a security context identifier, a ProSe group ID or service ID and related group/service credential information.

Also, the discovery message may include a reason indicating why a relay is requested, e.g. low battery, out of range of base station, bad signal to base station, relay was recommended by NRF. It may include received signal strength of any messages received from nearby devices, which signal strength data may aid the NRF in Relay selection. Also, it may include power status information of the device, e.g. power source, battery powered, mains powered, or solar power; or current battery level information. Furthermore, it may include standard fields such as transmit signal strength of message, UE identity information. The UE identity information may optionally be a derived or temporary ID for privacy reasons, which the NRF/CN can calculate back to real UE ID if needed.

Also, the discovery message may include distance measurement data or other type of location information, for example speed (which may be absolute speed or relative speed) and/or heading/direction information of the mobile device. The mobile device 110 and/or the relay device may be arranged to perform a distance measurement between the mobile device and a relay device. The connection processor 112 may be arranged to enable a distance measurement and to transfer the measured distance to the network for determining location data of the mobile device and/or the relay device. By receiving one or more distance measurements between the mobile device and relay devices, the NRF is enabled to enhance the selection of the relay devices. In practice, the location data based on receiving the transmissions from mobile devices are not very accurate, e.g. having a tolerance of 100 m. On the contrary, local distance measurements are much more accurate, e.g. having a tolerance of 1 m. Combining multiple locations of multiple mobile devices with the distances between such located devices may increase the accuracy of the location data.

In an embodiment of the system, in order to detect the distance between the mobile device and a relay device, a special mode could be requested on the devices to measure the distance, for example by using Wi-Fi fine-time measurement as specified in IEEE 802.11-2016, or by the MNO authorizing the ProSe function (as specified in [23.303] and [24.334]) on both devices so that they can discover each other using the sidelink D2D communication channel and perform distance measurement or proximity detection, e.g. through PC5 or Wi-Fi Aware ranging.

In an embodiment of the system, possible contents of request message (M) with the requested network slice identifier may be the following. When a requesting UE originates the request message as further sent to NRF, as part of the registration procedure, the message may include a source address or identifier of the mobile device, i.e. the UE itself. The request message may also include QoS requirements, or sets of requested QoS, e.g. a preferred set and an alternative fallback set. It may also contain information about relay UEs in the area that was obtained during the original relay UE discovery process, such as signal strength. Alternatively, this information could be included in the transfer request message (M') by the relay device, or the selected relay devices, for the indirect connection and/or by the base station when forwarding the messages from the UE to the core network. Or alternatively, the NRF may request this information and additional relevant information from the RAN, AMF or other network functions, as described earlier.

When a relay device originates a message based on information received from requesting UE, e.g. during the discovery process or the indirect connection setup, the relay UE may send the message to NRF to indicate that a requesting UE is looking for a relay UE, and include its own source address or identifier in the message.

In an embodiment of the cellular communication system the network relay entity may be arranged to obtain metadata from the cellular communication system such as received signal strength, signal quality or a distance estimation. Alternatively, or additionally, the transfer request message comprises metadata identifying the current connectivity state, such as manner of network connection, quality of service (QoS) and number of hops, connection stability information and/or frequency bands being used or supported frequency bands of the relay device. The network relay entity (140) may be arranged to determine the network relay information in dependence of the metadata.

The metadata may also be obtained from other sources in the cellular communication system, e.g. sources within the RAN or core network. For example, the number of hops may be obtained from the base station, and the distance estimation may come from a location service in the core network. Also, subscription information from the UDM may be important, e.g. to assess if the relay UE is operated by the same MNO as the remote UE, or to assess if a relay UE is authorized to access a certain slice, or to serve as a relay within a certain slice. UE capability information may come directly from the UE, but may also be (partially) provided by the UDM or SCEF. Since the resources of the relay UEs and remote UEs are typically scheduled by the base station, the base station is the device having the knowledge of whether the relay UEs and the remote UEs can be given sufficient sidelink resources to accommodate a certain QoS request from the AMF/NRF to accommodate the QoS requirements of a certain network slice.

In an embodiment, the NRF may decide whether or not the QoS requirements for a certain network slice can be met. QoS represent important criteria for deciding which relay devices would be capable to serve as relay for a particular slice.

In an embodiment, the NRF may use the properties/requirements of the specific slice to determine which relay(s) are preferred to be use. For example, for an IoT slice, it may be preferable to select a relay device that is stationary or that is not an IoT device by itself.

The relay device may optionally include metadata about the requesting UE's message such as RSSI or signal quality or a distance estimation, or the signal quality or distance estimation to another relay device. It may also include information that identifies its current connectivity state, such as one or more of:

manner of direct/indirect connection;

QoS information and/or number of hops towards gNB;

(past) connection stability information;

buffer sizes;

current number of connections;

information about data flows or duty/sleep cycles;

frequency bands currently being used by the relay UE, or supported frequency bands. The NRF may also obtain such information by interfacing with the RAN/gNB or other core network functions. The RAN/gNB may provide additional information e.g. about the available resources for sidelink communication for each of the relay UEs and remote UE. The NRF, receiving such information, may use it for the decision process. For example, the NRF may use the number of hops with QoS information and/or signal quality information together to determine whether a given relay UE can satisfy the slice requested by UE. E.g. if it is a slice that offers low latency communication, a relay UE with high number of hops is not preferred. The NRF may even disallow the use of the slice if the required latency cannot be achieved due to the number of hops, and may indicate this to the originating UE.

Also the message to NRF may optionally include UE capabilities of the relay UE. The UE's capabilities information may include:

information about the relay functionality, which may, e.g., include specific constraint information under what circumstances the UE is capable of Relaying;

Radio Rx/Tx speed category, or 3GPP UE class/level;

Radio Frequency bands being used or supported;

Processor performance class and/or current load;

Mobility information: fixed (e.g. a roadside V2X node), or possibly mobile (e.g. a mobile phone or worn sensor). Also location/heading information may be included, e.g. in V2X cases;

Power source, battery level or expected device operational duration information (which can be used in making optimal Relay decisions);

Identifications of specific relay-related security contexts that the device already supports;

Preferences for relaying certain application types, application IDs, or group IDs.;

Support for IP traffic and certain packet sizes.

Support for certain services, such as location support.

What type of relay the relay device is capable of supporting, e.g. layer-2 relay (on PDCP level) or layer-3 relay (on IP level). The NRF may use the above capabilities information to determine an optimal selection of relay UEs given the properties/requirements of the specific slice, or slices, that are requested. For example:

For an IoT slice: a non-mobile, mains-powered node with ample resources and high speed connectivity may be preferred as a relay UE above a battery-powered, mobile, low-resource IoT sensor;

For an IoT slice: using a relay UE that is itself not an IoT device may be preferred above a direct network connection for the IoT device, in order to save battery;

For a V2X slice: using a relay UE that is itself in the V2X slice may be preferred;

For a V2X slice: using a relay UE that is moving into the same direction as the requesting UE may be preferred. Even if the relay UE is not in the same V2X slice;

The NRF may use currently used frequency bands information of relay UEs in the selection process. When the NF obtains information about currently used frequency band(s) of relay UEs, e.g. from the message receive from a relay UE, or from gNB, or other means, the NRF may use this information in the selection to determine which relay UE cannot serve a specific slice. This happens e.g. if a slice is associated to using specific dedicated frequency band(s), such as a 'V2X' slice using V2X-reserved frequency band. Some candidate relay UEs may not be operating in this band currently so these may not be suitable to perform any relaying role for this slice. The NRF may exclude these candidate relay UEs from the selection process, or may still include them but as candidates with low preference. As a fallback solution such relay UE could serve the 'V2X' slice via a different band. The same holds for NB-IoT/LTE-M devices, which may operate in guard bands that may not be supported by e.g. mobile phones that may be candidate relay UEs.

In a further embodiment the requesting UE may indicate a security context or key to use for subsequent attachment to a relay UE. The security context for relaying may be linked to the security context for a slice. In ProSe, a remote UE and relay UE need to possess a shared security context (i.e. key material) to be able to establish a D2D connection to use for relaying purposes. In existing specifications the security context is preconfigured at application level which limits the usefulness of the relay function to only devices that have the same application context. In an enhancement, arbitrary yet unknown UEs may be supported as relays. In this embodiment, the following may apply.

The requesting UE may indicate in its discovery message a security context, or key, C which it supports. This may be a slice-specific security context, or a more general one that is valid for multiple slices, or e.g. a security context for a (third party) defined group of devices, e.g. all medical devices within a hospital or a ProSe application group. The context information may also include a random ID or partial key that can be used by NRF/CN later to derive the complete key to use.

The relay UE may send information about security context C to the NRF, such that NRF is able to retrieve information related to that security context from the CN.

The NRF may include information based on above, such as key material or credentials, in the response message sent back to Relay UE.

The relay UE may subsequently use the security information to accept a secure relay-request from requesting UE, performed in a secure manner, e.g. to protect against eavesdropping, replay, packet injection etc. during the relay establishment protocol.

It is noted that using the above mentioned random ID or partial key, the potential impact of malicious relay UEs storing and sharing the security material is reduced because the security material will only be valid for a temporary period.

In an embodiment, the CN may detect that a UE went OoC. Subsequently, the CN may request one or more UEs that it calculates are likely to be nearby the OoC-UE to start broadcasting 'Relay available' messages to aid the OoC-UE to quickly discover a suitable relay UE. In this case the CN may involve the NRF to determine, based on the previous slice information of OoC-UE, which Relay UEs are most suitable to be made available in this manner.

Furthermore, the NRF may authorize and instruct selected relay UE candidate(s) to activate their relay functionality in case they were not acting as relay yet. This assures fast connection to the chosen relay UE later on, since it is already activated and has the network permission/authorization to act as relay UE. Also, after the NRF has determined an optimal relay device for the requesting UE, it may notify the gNB of decision and the expected slice requirements from the requesting UE. This allows gNB to start scheduling proper resources to support the requesting UE. This has the benefit that the proper resources for requesting UE operation in its desired slice(s) are already prepared and scheduled at the gNB even before the UE is fully attached to that relay UE and the CN. This shortens any temporary QoS/bandwidth issue during relay transition or transition from direct network connection to a relayed connection.

Furthermore, if one of the requested slices is an 'emergency' type slice, this may be given priority in the selection process, or it may receive special treatment from potential candidate relay UEs, e.g. automatically enable them to act as relay UEs, and allow the emergency connection to be set up to any of the discovered candidate relay UEs. Alternatively, the emergency slice may automatically be included in the discovery response by candidate relay UEs. This may also be done for relay UEs that are participating in slices with known restricted usage, such as Public Safety. These are unlikely to act as relay UE for any other device, and hence may include the Public Safety slice automatically in its response, and may not even contact the NF in the process.

Furthermore, the discovery message or 'Request Relay' message may include an identifier that indicates a class of device or class of application that the UE is related to. For example, medical devices could be a separate class as well as emergency services devices. An application class may be IoT applications of the local government'. This identifier may help a UE to make a decision as to whether or not it will act as relay UE for a device indicating this particular identifier. This allows potential relay devices to configure for which purposes they would like to help in a relay role, for example medical applications may be seen as more important to users than purely commercial applications. Also, not all relay devices may be acceptable to be used to relay for medical or safety related data, e.g. in order to comply with regulatory rules on medical data processing and transport. To prevent fraud (spoofing of identifier), a cryptographic certificate, signature or proof element may be added with communications such that the UE can prove that it is part of the claimed application or device class.

In an embodiment, it may happen that a UE gets out of range, but still can receive (e.g. weakly) the synchronization information and/or other broadcast messages from eNB but is not able to send back due to long distance, signal obstruction or lack of battery power or transmitter output power, i.e. the eNB will not hear the device. In such case, the eNB may assume that the UE might be still listening and proactively transmit certain instructions to the UE. For example, the network may instruct such UE to start request-
ing for a relay, possibly including channel information and
timing information. Or it could transmit to the UE what are
best times to transmit a 'Relay Request', e.g. as part of a
discovery message.

If a UE just lost contact to eNB, it may either use
(previous) synchronization with base station as a basis for its
local clock, or alternatively detect a synchronization signal
from devices operating in discovery mode. If contact was
just lost, the eNB may provide synchronization information
given to various candidate relay UEs in vicinity including
information when the UE was last seen, and/or further
including possible estimations of clock drift and/or timing
margins to adjust their listen time windows to ensure maxi-
mum probability to hear the expected transmission from the
UE. Alternatively, the candidate relay devices may receive
information from eNB about previous scheduled resources
for the UE on Sidelink or Uplink channels. The relay devices
may use this to listen to the 'Relay Request' message at the
right time/frequency.

If the UE is already connected to a slice via a relay
connection, and detects insufficient bandwidth/QoS is avail-
able for its communication as required/expected for the slice
it is currently operating with, it could initiate a request to one
of the other candidate relay UEs it has discovered previously
based on the preference information indicated by the NRF.
Alternatively, it could initiate a new discovery process, or
send a request directly to the NRF (or AMF/RAN) to provide
(up to date) information about which other relay UE to select
to meet the QoS properties of the slice, in which case the
NRF/RAN/AMF may be involved in initiating a discovery
process amongst relay UEs and gNBs in a certain geo-
graphic area near the UE.

Similar to above, the eNB/network may detect that insuf-
ficient bandwidth or QoS is available and proactively launch
a process to find a suitable relay. The UE is then first
instructed to send the 'Request Relay' message and secondly
instructed to connect to a specific Relay or pick from a set
of Relays.

It is noted that a user or operator of the UE offering a relay
function to others may be rewarded or compensated for this
effort. The compensation may be in various forms like
payment, adding usage credits to its cellular subscription
bundle, or specific service benefits, e.g. being able to make
use of other relay devices. Some charging functions may
need to be extended for this. This may include specific
charging functions for acting as relay UEs for certain slice
of which the relay UE may or may not have a subscription
to operate in, e.g. private slices.

In an additional embodiment, a set of Connection Context
Identifiers (CCIs) is defined by the mobile network, whereby
each CCI is mapped to a combination of PDU session
parameters [23.501], such as PLMN ID (+NID/CAG ID),
S-NSSAI, DNN, PDU session type, etc., and possibly some
additional parameters, such as group IDs, QoS requirements,
frequencies, security context, etc. that Remote UEs may
wish to use for connecting to the core network via a Relay
UE. Some of these parameters may impose restrictions on
whether a Relay UE is authorized and capable of acting as
a relay for the Remote UE.

Since a lot of the above mentioned information is privacy
sensitive and could lead to tracking of Remote UEs and
expose deployment information of the operator (e.g. which
slices/NPNs are supported by the core network), it may be
preferable that this information be stored and used as much
as possible in the core network, and not be provisioned as
such to Relay UEs, which may be considered untrusted end-user devices. Storing, using and processing this infor-
mation inside the core network also makes it possible to deal
with the dynamic aspects of using slices, e.g. in order to
meet the QoS requirements defined by the service level
agreement for the network slice. Even though Remote UEs
are also untrusted end-user devices, some of this information
may need to be provisioned to the Remote UE, since Remote
UE's are likely out of coverage when they need to discover
and make use of a Relay UE to reach the network. However,
for a Remote UE exposing some of this information is less
problematic, because the Remote UE can be provisioned
solely with the PDU session parameters that are enabled by
the Remote UE's subscription. For Relay UEs this is dif-
ferent, since it could potentially act as a relay for a diverse
set of Remote UEs (which may even include inbound
roaming Remote UEs). The CCIs that may be used by the
Remote UE may only be known to the operator of the
Remote UE, and hence may not be known to the Relay UE
at the time of discovery, but they may be retrieved from the
home operator of the Remote UE by the network operator of
the Relay UE (i.e. the visiting network).

Furthermore, given the potential number of slices and
NPNs that may be supported by the 5GC, the number of
possible combinations of the above mentioned parameters
may potentially be quite high and may require quite a large
number of CCIs.

In order to have to provision as few CCIs to the Relay UE
as possible, and also to make sure a Remote UE which may
use potentially unknown or outdated CCIs can still discover
a Relay UE and request access to the network via the Relay
UE, a solution is to use one or more Generic CCIs. Whereas
CCIs are bound to a particular set of PDU session param-
eters and may not be known to the relay UE, a Generic CCI
is an identifier (e.g. predefined value with possibly a longer
lifetime and possibly commonly used for different PLMNs)
that may be used as a 'wildcard' to request access to any set
of PDU session parameters for one or more PLMNs. The
Generic CCI value may be mapped to or indicate some
wildcard values (e.g. such as asterisk, regular expressions).
The Generic CCI value may be associated to an initial
security context by which the remote UE and relay UE may
prove that they are authorized to issue a discovery or
connection setup request through which the remote UE can
request access to a particular slice/NPN and/or to use a
particular set of PDU session parameters, via the relay UE.
The Generic CCI may also be associated with the default
network slice for one or more PLMNs. Alternatively, the
Generic CCI may be associated to an application context or
(V2X) Application ID [23.287]. It is advantageous that at
least one Generic CCI is provisioned in both the remote UE
and relay UE. Using a Generic CCI may also make it easier
to support Model A discovery (i.e. broadcasting 'I'm here')
because these messages can remain small, and normally
does not contain an extensive list of CCIs, which may
regularly need to be changed. It also makes it easier to
discover all the available options that are available for the
remote UE by using a single identifier in the request mes-
sage, instead of having to include a potentially large list of
identifiers. The Generic CCI may also be used as a trigger in
the remote UE and the relay UE to include a specific CCI as
part of a discovery message or connection request. Alterna-
tively, a separate message could be defined to send a Generic
CCI, but the benefit of using a Generic CCI is that the same
discovery and PC5 connection setup messages can be
reused.

Figure 7:
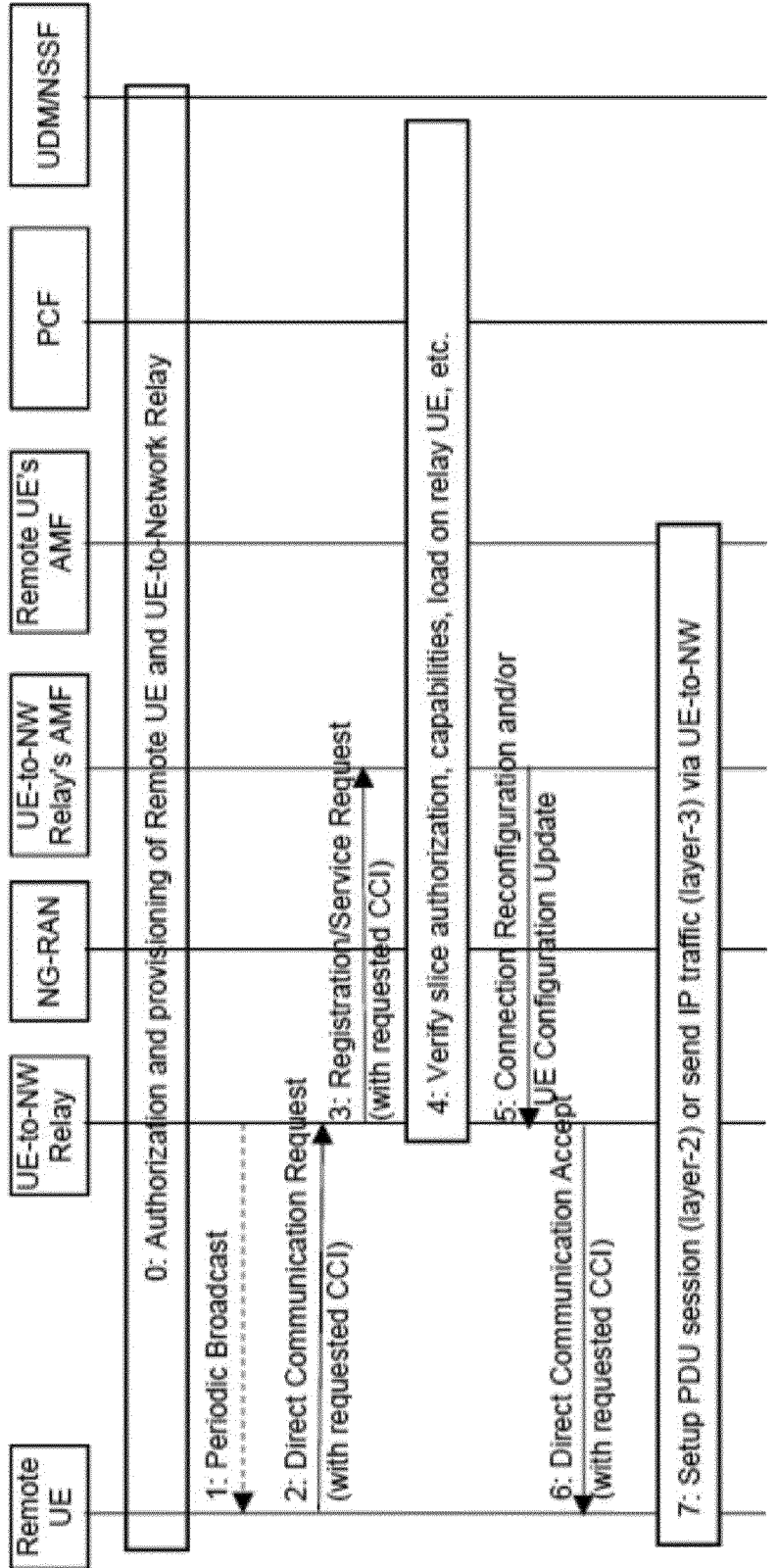
FIG. 7 shows an example of an NRF-assisted relay selection sequence, according to an embodiment.

The detailed procedure is described below and illustrated
in FIG. 7.

Step 0: Before the discovery of the Relay UE can be performed, the following information should be provisioned in the Remote UE and Relay UE beforehand, e.g. by using a UE Configuration update procedure [23.501], e.g. initiated from the AMF or PCF:

For the Remote UE:

One or more CCIs which the Remote UE is authorized to use, including a flag indicating for each CCI if it is a generic CCI or a specific CCI.

The mapping between each CCI that the Remote UE is authorized to use and the default Destination Layer-2 ID(s) for initial signalling to establish a PC5 unicast connection [23.287].

The mapping between each CCI and a set of PDU session parameter values, which may include amongst others one or more of:

PLMN ID
NID/CAG ID
S-NSSAI
DNN
PDU Session Type

For Generic CCIs, the set may be empty or a small subset of parameters, may indicate some wildcard values (e.g. such as asterisk, regular expressions), or may contain special pre-defined values e.g. to denote the default slice.

(Optional) The mapping between each CCI and a security context (e.g. set of credentials).

A policy to restrict the Remote UE's PDU sessions to the PDU session parameter values corresponding to a requested CCI.

For the Relay UE:

One or more CCIs which the Relay UE is authorized to expose and react upon during discovery, including a flag indicating for each CCI if it is a generic CCI or a specific CCI. This should be a small subset of all the CCIs that the Relay UE may be able to handle and be configured for after consulting the Relay UE's AMF, in order to reduce the exposure of potentially privacy sensitive information.

The mapping between each of the CCI for which the Relay UE is authorized to expose and react upon during discovery, and the default Destination Layer-2 ID(s) for initial signalling to establish PC5 unicast connection [23.287].

(Optional) The mapping between each CCI and a security context (e.g. set of credentials).

(Optional) default destination layer-2 ID for broadcast communication over PC5 [23.287].

In addition, the AMF of the Relay UE should be provided with the following information (either beforehand, or the AMF can consult the respective network functions, such as PCF, NSSF, UDM when the AMF receives the transfer request message (M)):

An extensive list of CCIs which the Relay UE may be able to handle and get authorized for, including a flag indicating for each CCI if it is a generic CCI or a specific CCI. Since the list of CCIs for the AMF may not always be updated at the same time as for the remote UEs (and relay UEs), which may be out-of-coverage for a while, the AMF should also keep a history of old CCI values.

The mapping between each CCI and a set of PDU session parameter values, which may include amongst others one or more of:

PLMN ID
NID/CAG ID
S-NSSAI

DNN
PDU Session Type

For Generic CCIs, the set may be empty or a small subset of parameters, may indicate some wildcard values (e.g. such as asterisk, regular expressions), or may contain special pre-defined values e.g. to denote the default slice.

The PCF in the HPLMN of the UE that needs to be provisioned to be a Remote UE or Relay UE may interact with PCF of other PLMNs (e.g. possible Visiting PLMN of roaming partners) to perform CCI allocation and management.

Step 1: The Relay UE may periodically broadcast one or more CCIs for which the Relay UE is configured using a (V2X) Broadcast Message over PC5. In order to keep the broadcast message small, the set of CCIs is preferably kept very small and preferably include a generic CCI.

Step 2: The Remote UE can initiate discovery to find a Relay UE by sending a Direct Communication Request over PC5 as specified in TS 23.287 or similar message with the requested CCI being used as a (V2X) service/application identifier. If the requested CCI is a generic CCI, the Direct Communication Request may include an additional CCI, which is indicative of a set of PDU parameters that the Remote UE wishes to use. The Direct Communication Request uses the default Destination Layer-2 ID configured for the requested CCI (or if known the Layer-2 ID of the target Relay UE), and in case of V2X is typically sent over a Sidelink shared broadcast/multicast channel and can be received by multiple Relay UEs. This Direct Communication Request message corresponds to the request message (M) referred to elsewhere in this document.

Step 3: One or more Relay UEs may receive the Direct Communication Request over PC5. If the CCI in the Direct Communication Request matches a CCI that is known to the Relay UE, the Relay UE sends a Registration Request [23.501] or Service Request [23.501] or a dedicated request message to the Relay UE's serving AMF (not only in CM_IDLE state, but also in CM CONNECTED state). The Registration/Service/dedicated request message includes the requested CCI, and if the Relay UE has received an additional CCI in the Direct Communication Request in step 2, then the additional CCI will be included in the Registration/Service/dedicated request message. Preferably the additional CCI is included instead of the generic CCI. The Relay UE may (re-)use an existing PDU session that it has established beforehand to connect to the Relay UE's AMF to send the Registration/Service/dedicated Request message. This Registration/Service/dedicated request message corresponds to the transfer request message (M') as used in other parts of this document.

Step 4: The Relay UE's serving AMF will receive the transfer request message (M') and verify if the Relay UE is authorized to serve as Relay UE for the given CCI, and in particular the associated network slice (indicated by S-NSSAI) and/or NPN (indicated by PLMN ID+NID/CAG ID) in the mapping table between CCIs and PDU session parameters, and also verifies if the Relay UE is capable to meet the requirement associated with the CCI's PDU parameters, in particular if it is capable and authorized to act as relay for the associated network slice (indicated by S-NSSAI in the mapping table) and/or NPN (indicated by PLMN ID+NID/CAG ID), and whether it can meet the QoS requirement of the particular slice/NPN. In order to perform the verification, the AMF may request information from other network functions, such as NSSF (about allowed network slices), RAN (about capabilities and load of the Relay UE, congestion, and signal quality), SMF (about ongoing PDU sessions and their QoS), UDM (for subscription related information), PCF (for policy information, PDU session configuration and QoS related information), NWDAF (for combined measurement information, analytics data, and historical data), ProSe function, application function, etc. In case the relay UE sends a Generic CCI to the AMF and no additional value is supplied in the transfer request message (M'), then the AMF will decide for each set of combinations of PDU session parameters whether or not these can be served by the relay UE. In case the CCI value is not part of the mapping to PDU session parameters in the AMF, the AMF may search its history of previous CCI values or may contact the AMF (or database) of 5G networks of other network operators.

Step 5: If it is decided that Relay UE can act as relay for the given CCI and its associated network slice(s) and/or NPN(s) and other PDU session parameters, then the AMF will send a RRC Connection Reconfiguration message and/or may send a UE Configuration Update and/or dedicated message to the Relay UE. This Connection Reconfiguration/UE Configuration Update/dedicated message may include information to reconfigure an existing PDU session between the relay device and the network to accommodate relaying network traffic for a particular slice (e.g. change the DNN, connect to different User Plane Function), update the UE configuration (possibly including different S-NSSAI information, different policy information, different credentials) and issue a reconnect (which may e.g. lead to selecting a different Access and Mobility Management Function (AMF) to serve the network slice), This Connection Reconfiguration/UE Configuration Update/dedicated message may include instructions to initiate additional PDU sessions with the network in case the Relay UE is already serving other Remote UEs. This Connection Reconfiguration/UE Configuration Update/dedicated message may also include instructions to connect to a different PLMN/NPN, and may include instructions for the radio access network, e.g.to send an updated list of Allowed NSSAI values for the relay UE and/or remote UE, or e.g. instructions to camp on specific cells to access an NPN (identified by CAG ID in case of a public network operated NPN or NID (together with PLMN ID information) in case of a standalone NPN).

In particular, the AMF may configure a PDU session of the relay device to connect to a cellular base station which is configured (within the Radio Access Network, e.g. based on an NGAP message [38.413] from the AMF to the Radio Access Network) with the CAG ID/NID being part of the Allowed CAG/NID list in the Mobility Restriction information and/or which is configured as a CAG cell which may broadcast the CAG ID/NID within a system information block and/or for which the Radio Access Network is configured to report to the core network (e.g. within an NGAP message [38.413] to the AMF) the CAG ID/NID denoting the non-public network if the relay device connects directly or the mobile device connects indirectly via the relay device to the cellular base station configured as a CAG cell and/or for which the CAG ID/NID is part of the Allowed CAG/NID list in the Mobility Restriction information.

If it is decided that Relay UE cannot act as relay for the given CCI and its associated network slice(s) and/or NPN(s) and other PDU session parameters, then the AMF will include a 'Relay rejected' error code for the requested CCI as part of this Connection Reconfiguration/UE Configuration Update/dedicated message. This Connection Reconfiguration/UE Configuration Update/dedicated message may also include information about other CCIs (e.g. a list of CCIs for the possible combinations of PDU sessions parameters the relay UE is able to relay in case only a Generic CCI is sent to the AMF) and information about other Relay UEs in vicinity. This Connection Reconfiguration/UE Configuration Update/dedicated message corresponds to the transfer response message (N') as used in other parts of this document.

Step 6: If relaying for the given CCI is not rejected by the Relay UE's serving AMF in step 4/5, the Relay UE performs the PC5 unicast link security procedure [23.287] and sends a Direct Communication Accept message [23.287] to the Remote UE that includes the given CCI as (V2X) service/application identifier. The Direct Communication Accept message may include some QoS information, IP config information (e.g. for layer-3 relaying), and possibly some additional information about the relay. The message may also include information about other CCIs and information about other Relay UEs in vicinity. If relaying for the given CCI is rejected by the Relay UE's serving AMF in step 4/5, then the Relay UE may either not send any response to the Remote UE, or may send a Direct Communication Reject message [24.587]. This could be used to send other CCIs and information about other Relay UEs in vicinity to the Remote UE. This Direct Communication Accept/Reject message corresponds to the response message (N) as used in other parts of this document.

Step 7: After it has successfully concluded steps 2-6, the Remote UE can start the indirect communication to the core network by using the PC5 connection that was set up between the Remote UE and the Relay UE using the Direct Communication Request/Accept procedure, whereby the Relay UE will relay the received traffic from the Remote UE to the network. In case of layer-2 relay (i.e. forwarding PDCP messages), the Remote UE can initiate/resume a PDU session by sending a Registration/Service Request to the network, whereby it needs to restrict the PDU parameters that it uses (e.g. in the Initial Registration) to the configured PDU parameters related to the CCI as received in the Direct Communication Accept message. In case of layer-3 relay (i.e. forwarding IP packets), the Remote UE will receive IP address information from the Relay UE that it can use for transmitting IP traffic to the Relay UE, which will then forward it to the correct destination based on the configured PDU parameters related to the CCI. If the Remote UE wants/needs to establish a PDU session with different PDU parameters (e.g. different S-NSSAI or different CAG ID/NID), the Remote UE shall repeat steps 2-7. In case of layer 2 relaying, each time the Remote UE sets up a new PDU session, the AMF should verify if the PDU parameters used correspond to a CCI that was received in step 4. If not, the AMF may reject the PDU session or send a RRC Reconfiguration or UE Configuration Update message to the Remote UE via the indirect connection.

Various methods are provided for use in a cellular communication system as described above. A first method comprises steps to perform, in the mobile device, the relay function. A second method comprises steps to perform, in the relay device, the function of the relay processor. A third method comprises steps to perform, in the cellular network, the network relay function.

Many different ways of implementing the methods are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, the mobile device, the relay device and the NRF, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6:
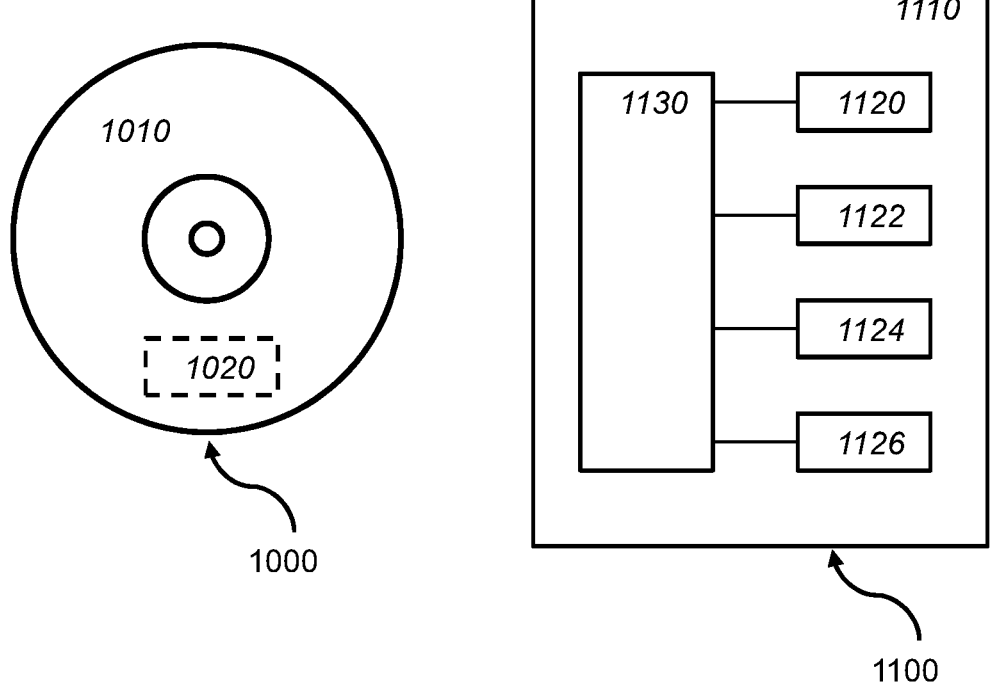
FIG. 6a shows a computer readable medium.
FIG. 6b shows in a schematic representation of a processor system.

FIG. 6a shows a computer readable medium 1000 having a writable part 1010 comprising a computer program 1020, the computer program 1020 comprising instructions for causing a processor system to perform one or more of the above methods and processes in the system as described with reference to FIGS. 1-4. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

FIG. 6b shows in a schematic representation of a processor system 1100 according to an embodiment of the devices or methods as described with reference to FIGS. 1-4. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the verb 'comprise' does not exclude the presence of elements or steps other than those listed and the word 'a' or 'an' preceding an element does not exclude the presence of a plurality of such elements. Expressions such as 'at least one of' when preceding a list of elements represent a selection of all or of any subset of elements from the list. For example, the expression, 'at least one of A, B, and C' should be understood as including only A, only B, only C, both A and B, both A and C, both B and C, or all of A, B, and C. Any reference signs do not limit the scope of the claims. The invention may be implemented by means of both hardware and software. Several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, a cellular communication system supports network slicing and has a network relay function for managing the indirect connections. A mobile device may send a request message to a relay device, the request message including an identifier indicating a requested slice to access. A response message optionally includes information indicating available slice(s) and/or relay device(s). The device selects a relay device in dependence of the response message. The relay device receives the request message and sends a transfer request message to the cellular communication system indicating a request to transfer data via an indirect connection and including the requested identifier, and sends the response message. The network relay function receives the transfer request message, obtains relay capability data regarding relay device(s) capable of data transfer for available slice(s) in dependence of the requested slice; and sends a transfer response message including information indicating the available slice(s) and relay device(s).

REFERENCES

[22.261] 3GPP TS 22.261 v16.7.0, Service requirements for the 5G system; Stage 1, 2019-03.

[22.866] 3GPP TR 22.866 v0.2.0, enhanced Relays for Energy Efficiency and Extensive Coverage; Stage 1, 2019-02.

[23.287] 3GPP TS 23.287 v1.0.0, Architecture enhancements for 5G System (5GS) to support Vehicle-to-Everything (V2X) services (Release 16), 2019-05.

[23.303] 3GPP TS 23.303 v15.0.0, Proximity-based services (ProSe); Stage 2 (Release 15), 2017-06.

[23.501] 3GPP TS 23.501, System Architecture for the 5G System; Stage 2, v16.0.2, 2019-04.

[23.503] 3GPP 23.503, TS Policy and charging control framework for the 5G System (5GS); Stage 2 (Release 15.6.0 2019-06)

[23.733] 3GPP TR 23.733 v15.1.0, Study on Architecture Enhancements to ProSe UE-to-Network Relay (Release 15), 2017-12.

[24.334] 3GPP TS 24.334 v15.1.0, Proximity-services (ProSe) User Equipment (UE) to ProSe function protocol aspects; Stage 3, 2017-12.

[24.501] 3GPP TS 24.501, Non-Access-Stratum (NAS) protocol for 5G System (5GS); Stage 3 (Release 15.4.0 2019-06)

[29.507] 3GPP TS 29.507, 5G System; Access and Mobility Policy Control Service; Stage 3, (Release 15.4.0 2019-06)

[33.813] 3GPP TR 33.813 v0.5.0, Study on Security Aspects of Enhanced Network Slicing, 2019-06.

[36.300] 3GPP TS 36.300 v15.2.0, Evolved Universal Terrestrial Radio Access (E-UTRA) and Evolved Universal Terrestrial Radio Access Network (E-UTRAN); Overall description; Stage 2 (Release 15), 2018-06.

[36.746] 3GPP TR 36.764 v15.1.0, Study on further enhancements to LTE Device to Device (D2D), User Equipment (UE) to network relays for Internet of Things (IoT) and wearables; (Release 15), 2017-12.

[38.300] 3GPP TS 38.300 v15.5.0, NR; NR and NG-RAN Overall Description; Stage 2, 2019-03.

[38.331] 3GPP TS 38.331 v15.5.1, NR; Radio Resource Control (RRC) protocol specification, 2019-04.

[38.473] 3GPP TS 38.473, v15.4.1, NG-RAN; F1 application protocol (F1AP), 2019-01.

[38.874] 3GPP TR 38.874 v16.0.0, NR; Study on Integrated Access and Backhaul, 2018-12.

[S2-1907204] 3GPP TS 23.501 CR1522 Introduction of the IAB support in 5GS, 2019-06.

[Elayoubi] Elayoubi et al., 5G RAN Slicing for Verticals: Enablers and Challenges, IEEE Communications Magazine Vol. 57 Iss. 1, 2019.

[EventHelix] EventHelix website, https://www.eventhelix.com/5G/standalone-access-registration/with links to pdf file overview and detailed messages.

[PavelShulgin] 5G StandAlone Access—Registration Procedure—Part2(AMF selection procedures, slices), https://www.linkedin.com/pulse/5g-standalone-access-registration-procedure-part2amf-pavel-shulgin/

The invention claimed is:

1. A cellular communication system (CCS) comprising a radio access network (RAN) comprising multiple cellular base stations (BS) and a core network (CN), the cellular communication system providing a cellular network that supports network slicing and indirect connections, each network slice providing a logical network using a shared physical infrastructure of the cellular communication system, each indirect connection providing data transfer between a mobile device and the cellular communication system via at least one relay device being a second mobile device arranged for communication with the radio access network and capable of supporting the indirect connection, the cellular communication system comprising at least one network relay entity arranged to provide a network relay function (NRF) for managing the indirect connections, the mobile device comprising:

a transceiver arranged for wireless communication in the cellular network, and a connection processor arranged for managing connections to the cellular network, the connection processor providing a relay function for managing at least one indirect connection, the relay function being arranged to at least:

initiate an indirect connection procedure by sending a request message (M) to at least one relay device (UEx), the request message including multiple requested identifiers (IDx) including a requested identifier (ID1) indicating a network slice which the mobile device requesting access to;

engage the indirect connection to the requested slice via the selected relay device;

the relay device comprising:

a communication unit arranged for communication in the cellular network, and a relay processor arranged for managing the communication in the cellular network and for managing an indirect connection between the mobile device and the cellular network, the relay processor being arranged:

to receive the request message (M) from the mobile device;

to send a transfer request message (M') to the cellular communication system in dependence of the request message, the transfer request message indicating a request from the mobile device to communicate with a requested slice via an indirect connection and including the requested identifier (ID1), wherein the relay device excludes any of the requested identifiers from the transfer request message (M') when those requested identifiers are configured in the relay device;

to receive a transfer response message (N') from the cellular communication system;

to send the response message (N) to the mobile device in dependence of the transfer response message;

the network relay function being arranged:

to receive at least one transfer request message (M') via at least one cellular base station;

to obtain relay capability data regarding relay devices capable of data transfer for at least one available slice to, and from, the mobile device, the available slice being determined in dependence of the requested identifier (ID1); and to send at least one transfer response message (N') via at least one cellular base station, the transfer response message indicating at least one relay device capable of transferring data of the network slice to which the mobile device is requesting access.

2. The cellular communication system of claim 1, wherein the requested identifier (ID1) indicates a generic network slice which the mobile device is requesting access to and request message (M) further contains a second requested identifier (ID2) indicating a specific network slice that the mobile device is requesting access to, and whereby the relay device performs one of the following:

sends the second requested identifier (ID2) for the specific network slice, instead of the generic slice identifier (ID1) as part of the transfer request message (M'), or sends both identifiers as part of the transfer request message (M') and whereby the response message (N) contains only the second requested identifier (ID2) for the specific network slice and not the requested identifier (ID1) for the generic network slice.

3. The cellular communication system of claim 1, wherein the request message (M) contains a security context identifier indicating a security context or security key, the relay processor being arranged to send the transfer request message (M') to the cellular communication system in dependence of the request message only when the security context or security key indicated by the security context identifier corresponds to a security context or security key which is configured in the relay device, and not send the transfer request message (M') when there is no match.

4. The cellular communication system of claim 1, wherein the indirect connection to the requested slice is setup over the same logical data connection via which the request message (M) and response message (N) are sent, said logical data connection being at least one of a PC5 connection, sidelink connection, or D2D connection.

5. The cellular communication system of claim 1, whereby the requested identifier (ID1) is used by the network relay function (NRF) to retrieve a set of Protocol Data Unit (PDU) session parameters that includes a network slice identifier, and the NRF configures a PDU session of the relay device and/or mobile device according to at least one of the parameters in the retrieved set of PDU session parameters.

6. The cellular communication system of claim 1, whereby the requested identifier (ID1) is used by the NRF to retrieve a set of PDU session parameters that includes an identifier denoting a non-public network, and the NRF configures a PDU session of the relay device to connect to a cellular base station (BS) which is configured to broadcast the identifier denoting the non-public network as part of its system information and/or which is configured to report the identifier denoting the non-public network to the core network (CN) when the relay device connects directly or the mobile device connects indirectly via the relay device to that cellular base station.

7. The cellular communication system of claim 1, whereby the requested identifier (ID1) is used by the NRF to contact a different Public Mobile Land Network (PLMN) to retrieve a set of PDU session parameters that includes a network slice identifier.

8. The cellular communication system of claim 1, wherein the transfer response message (N') comprises network relay information indicating a set (T) of relay devices; and/or the response message (N) comprises a set (T) of relay devices.

9. The cellular communication system of claim 1, wherein the network relay entity is arranged to determine that there are no relay devices capable of transferring data of a slice accommodating the requested identifier to, and from, the mobile device, and upon so determining, to send a slice denial to the relay device and/or the mobile device, the slice denial message indicating that there are no relay devices capable of data transfer for a slice accommodating the requested identifier.

10. The cellular communication system of claim 1, wherein the network relay entity is arranged to determine that the indirect connection engaged from the mobile device via the selected relay device is addressed to the requested slice and when it is addressed to a different slice, perform one or more of the following actions:

send a PDU session reject message to the remote mobile device via the indirect network connection, send a slice denial message to the relay device and/or mobile device, reconfigure the relay mobile device, or terminate the relay connection.

11. The cellular communication system of claim 1, wherein the connection processor in the mobile device is arranged:

to initiate a relay discovery process and to engage an initial indirect connection, and subsequently to send the request message via the initial indirect connection; and wherein the network relay entity or the relay function is arranged to reconfigure the initial indirect connection to said indirect connection to the selected slice via the selected relay device.

12. The cellular communication system of claim 1, wherein the relay processor in the relay device is arranged:

to send a preliminary response message (N **) to the mobile device in dependence of the request message (M); the preliminary response message indicating that the relay device is present but that the response message (N) in dependence of the transfer response message (N') will be sent later to the mobile device.

13. The cellular communication system of claim 1, wherein the requested identifier comprises a set of requested network slices, and wherein the network relay entity is arranged to determine at least one subset of available slices accommodating the requested set of network slices and at least one relay device capable of transferring data of the subset of available slices and/or the response message (N) contains the determined subset of available slices, upon which the mobile device selects one of the available slices to engage in indirect connection to the selected slice via the relay device from which it received the response message (N).

14. The cellular communication system of claim 1, wherein the network relay entity is arranged to determine additional relay capability data regarding at least one relay device, the additional relay capability data indicating a preference or suitability to serve as relay;

the transfer response message (N') comprising the additional relay capability data; and/or the response message (N) comprising at least part of the additional relay capability data.

15. The cellular communication system of claim 1, wherein the network relay entity is arranged:

to determine multi-hop relay capability data regarding at least one multi-hop indirect connection via multiple hops using multiple relay devices, the multi-hop relay capability data indicating available slices via the multi-hop indirect connection;

the transfer response message (N') comprising the multi-hop relay capability data; and/or the response message (N) comprising at least part of the multi-hop relay capability data;

wherein the network relay entity is arranged or to determine the available relay devices for the requested slice based on the achievable QOS; or to determine which relay devices are preferred to be used in dependence of properties or requirements of the respective slice.

16. The cellular communication system of claim 1, wherein the request message comprises one or more of the following:

security information about security credentials or a security context in which the mobile device operates or requires to operate in for the indirect connection or related to the requested identifier;

status information indicating why a relay is requested;

received signal strength of messages received from nearby devices;

power information of the device regarding the power source of the mobile device.

17. The cellular communication system of claim 1, wherein the network relay entity is arranged to obtain metadata from the cellular communication system such as received signal strength, signal quality or a distance estimation; or wherein the transfer request message comprises metadata identifying the current connectivity state, such as manner of network connection, quality of service (QOS) and number of hops, connection stability information and/or frequency bands being used or supported frequency bands of the relay device, and wherein the network relay entity is arranged to determine the transfer response message in dependence of the metadata.

18. The cellular communication system of claim 1, wherein the relay processor is arranged:

to receive the request message (M) from the mobile device, the request message including a requested identifier (ID1) indicating a network slice to which the mobile device is requesting access wherein the transfer request message (M') has been sent by the relay device in response to the reception at the relay device of request message (M), sent by a mobile device to initiate an indirect connection procedure.

19. The cellular communication system of claim 18, wherein the requested identifier (ID1) comprises a Connection Context Identifier (CCI) and the relay processor is arranged to reconfigure a Protocol Data Unit (PDU) session between the relay device and the network to accommodate relaying network traffic for a particular slice associated with the CCI.

20. The cellular communication system of claim 18, wherein the requested identifier (ID1) comprises a Connection Context Identifier (CCI) and the relay processor is arranged to start an additional Protocol Data Unit (PDU) session between the relay device and the network to accommodate relaying network traffic for a particular slice associated with the CCI.

21. The cellular communication system of claim 1, wherein the network relay entity is arranged:

to receive the at least one transfer request message (M'), including a transfer request message (M') sent by a relay device in response to the request message (M), wherein the transfer request message (M) has been sent by the relay device in response to the reception at the relay device of request message (M), sent by a mobile device to initiate an indirect connection procedure.

22. The cellular communication system of claim 1, wherein the relay function being arranged to receive at least one response message (N) from at least one relay device, the response message indicating at least one available slice for relaying via at least one relay device for providing an indirect connection and select, in dependence of the response message a relay device (UEy) from the at least one relay device.

23. The cellular communication system of claim 1, wherein the requested identifier (ID1) comprises a Connection Context Identifier (CCI).

24. A method for use in a cellular communication system (CSS), the cellular communication system, the cellular communication system comprising a radio access network (RAN) comprising multiple cellular base stations (BS) and a core network (CN), the cellular communication system providing a cellular network that supports network slicing and indirect connections, each network slice providing a logical network using a shared physical infrastructure of the cellular communication system, each indirect connection providing data transfer between a mobile device and the cellular communication system via at least one relay device being a second mobile device arranged for communication with the radio access network and capable of supporting the indirect connection, the cellular communication system comprising at least one network relay entity arranged to provide a network relay function (NRF) for managing the indirect connections, the mobile device comprising:

a transceiver arranged for wireless communication in the cellular network, and a connection processor arranged for managing connections to the cellular network, the connection processor providing a relay function for managing at least one indirect connection, the relay device comprising:

a communication unit arranged for communication in the cellular network, and a relay processor arranged for managing the communication in the cellular network and for managing an indirect connection between the mobile device and the cellular network, the method comprising steps to perform, in the mobile device, the relay function comprising:

managing at least one indirect connection, sending a request message (M) to at least one relay device (UEx) to initiate an indirect connection procedure, the request message including multiple requested identifiers (IDx) including a requested identifier (ID1) indicating a network slice which the mobile device is requesting access to;

receiving at least one response message (N) from at least one relay device, the response message indicating at least one available slice for relaying via at least one relay device for providing an indirect connection;

selecting, in dependence of the response message, a relay device (UEy) from the at least one relay device; and engaging the indirect connection to the requested slice via the selected relay device, the method further comprising steps to perform, in the relay device, the function of relaying comprising:

sending a transfer request message (M') to the cellular communication system in dependence of the request message, the transfer request message indicating a request from the mobile device to communicate with a requested slice via an indirect connection and including the requested identifier (ID1), wherein the relay device excludes any of the requested identifiers from the transfer request message (M') when those requested identifiers are configured in the relay device.

25. A computer program product stored on a non-transitory computer-readable medium and/or non-transitory microprocessor-executable medium, the product comprising program code instructions for implementing a method according to claim 24 when executed on a computing device.

26. A method for use in a cellular communication system (CSS), the cellular communication system the cellular communication system comprising a radio access network (RAN) comprising multiple cellular base stations (BS) and a core network (CN), the cellular communication system providing a cellular network that supports network slicing and indirect connections, each network slice providing a logical network using a shared physical infrastructure of the cellular communication system, each indirect connection providing data transfer between a mobile device and the cellular communication system via at least one relay device being a second mobile device arranged for communication with the radio access network and capable of supporting the indirect connection, the cellular communication system comprising at least one network relay entity arranged to provide a network relay function (NRF) for managing the indirect connections, the mobile device comprising:

a transceiver arranged for wireless communication in the cellular network, and a connection processor arranged for managing connections to the cellular network, the connection processor providing a relay function for managing at least one indirect connection, the relay device comprising:

a communication unit arranged for communication in the cellular network, and a relay processor arranged for managing the communication in the cellular network and for managing an indirect connection between the mobile device and the cellular network, the method comprising steps to perform, in the relay device, the function of relaying comprising:

managing the communication in the cellular network, managing an indirect connection between the mobile device and the cellular network, receiving the request message (M) from the mobile device, the request message including a requested identifier (ID1) indicating a network slice to which the mobile device is requesting access;

sending a transfer request message (M') to the cellular communication system in dependence of the request message, the transfer request message indicating a request from the mobile device to communicate with a requested slice via an indirect connection and including the requested identifier (ID1), wherein the relay device excludes any of the requested identifiers from the transfer request message (M') when those requested identifiers are configured in the relay device;

receiving a transfer response message (N') from the cellular communication system;

sending the response message (N) to the mobile device in dependence of the transfer response message.

27. A method for use in a cellular communication system (CSS), the cellular communications system the cellular communication system comprising a radio access network (RAN) comprising multiple cellular base stations (BS) and a core network (CN), the cellular communication system providing a cellular network that supports network slicing and indirect connections, each network slice providing a logical network using a shared physical infrastructure of the cellular communication system, each indirect connection providing data transfer between a mobile device and the cellular communication system via at least one relay device being a second mobile device arranged for communication with the radio access network and capable of supporting the indirect connection, the cellular communication system comprising at least one network relay entity arranged to provide a network relay function (NRF) for managing the indirect connections, the mobile device comprising:

a transceiver arranged for wireless communication in the cellular network, and a connection processor arranged for managing connections to the cellular network, the connection processor providing a relay function for managing at least one indirect connection, the relay device comprising:

a communication unit arranged for communication in the cellular network, and a relay processor arranged for managing the communication in the cellular network and for managing an indirect connection between the mobile device and the cellular network, the method comprising steps to perform, in the network, the network relay function comprising:

receiving at least one transfer request message (M') from a relay device via at least one cellular base station, the transfer request message including a requested identifier (ID1) indicating a network slice to which a mobile device is requesting access, wherein the transfer request message (M') has been sent by the relay device in response to the reception at the relay device of request message (M), sent by a mobile device to initiate an indirect connection procedure;

obtaining relay capability data regarding relay devices capable of data transfer for at least one available slice to, and from, the mobile device, the available slice being determined in dependence of the requested identifier (ID1); and sending at least one transfer response message (N') via at least one cellular base station, the transfer response message including network relay information indicating at least one available slice and at least one relay device capable of transferring data of the available slice, the method further comprising steps to perform, in the relay device, the function of relaying comprising:

sending the transfer request message (M') to the cellular communication system in dependence of the request message, the transfer request message indicating a request from the mobile device to communicate with a requested slice via an indirect connection and including the requested identifier (ID1), wherein the relay device excludes any of the requested identifiers from the transfer request message (M') when those requested identifiers are configured in the relay device.

28. The method of claim 27, wherein the transfer request message includes the requested identifier (ID1), the requested identifier (ID1) being used by the NRF to retrieve a set of PDU session parameters that includes a network slice identifier and the transfer response message including instructions to reconfigure an existing PDU session between the relay device and the network to accommodate relaying network traffic for the available slice, or start an additional PDU session.

29. The method of claim 27, wherein the transfer request message includes the requested identifier (ID1), the requested identifier (ID1) being used by the NRF to retrieve a set of PDU session parameters that includes a network slice identifier and the transfer response message including instructions to start an additional PDU session between the relay device and the network to accommodate relaying network traffic for the available slice.

\*     \*     \*     \*     \*